United States Patent
Zhang et al.

(10) Patent No.: US 11,889,585 B2
(45) Date of Patent: Jan. 30, 2024

(54) FORMING A VIRTUAL USER EQUIPMENT GROUP AND ENHANCING COMMUNICATION USING JOINT RECEPTION AND TRANSMISSION MECHANISMS

(71) Applicant: QUALCOMM Incorporated, San Diego, CA (US)

(72) Inventors: Xiaoxia Zhang, San Diego, CA (US); Jing Sun, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 17/203,472

(22) Filed: Mar. 16, 2021

(65) Prior Publication Data

US 2022/0007173 A1     Jan. 6, 2022

Related U.S. Application Data

(60) Provisional application No. 63/047,046, filed on Jul. 1, 2020.

(51) Int. Cl.
    *H04W 8/18*           (2009.01)
    *H04L 5/00*           (2006.01)
    (Continued)

(52) U.S. Cl.
    CPC .......... *H04W 8/186* (2013.01); *H04B 7/0626* (2013.01); *H04B 7/0842* (2013.01); *H04L 5/0035* (2013.01); *H04W 72/23* (2023.01)

(58) Field of Classification Search
    CPC ..... H04W 8/186; H04W 72/23; H04W 88/04; H04W 92/18; H04B 7/0626;
    (Continued)

(56) References Cited

U.S. PATENT DOCUMENTS

| | | | |
|---|---|---|---|
| 2014/0098731 A1* | 4/2014 | Maaref | H04W 76/40 370/312 |
| 2014/0119312 A1 | 5/2014 | Doetsch et al. | |
| (Continued) | | | |

FOREIGN PATENT DOCUMENTS

| | | |
|---|---|---|
| WO | 2015035873 A1 | 3/2015 |
| WO | 2020047024 A1 | 3/2020 |
| WO | 2020064555 A1 | 4/2020 |

OTHER PUBLICATIONS

International Search Report and Written Opinion—PCT/US2021/040105—ISA/EPO—dated Dec. 13, 2021.

(Continued)

*Primary Examiner* — Shaima Q Aminzay
(74) *Attorney, Agent, or Firm* — Patterson + Sheridan, LLP

(57) ABSTRACT

Aspects of the present disclosure provide apparatus, methods, processing systems, and computer readable mediums for forming a virtual user equipment (UE) group and enhancing communication using joint reception and transmission mechanisms. For example, a UE may establish sidelink channels for communications with one or more other UEs. The UE and the one or more other UEs may form a virtual UE group (also interchangeably referred to as a virtual UE) using the sidelink channels. The UE may exchange information with other UEs in the virtual UE group to enhance communications between the one or more UEs of the virtual UE group and a network entity. The information exchanged depends on at least one of a joint reception mechanism or a joint transmission mechanism used by the virtual UE group. The UE communicates with the network entity based, at least in part, on the exchanged information.

25 Claims, 17 Drawing Sheets

(51) Int. Cl.
*H04B 7/06* (2006.01)
*H04B 7/08* (2006.01)
*H04W 72/23* (2023.01)

(58) Field of Classification Search
CPC ...... H04B 7/0842; H04B 7/024; H04B 7/026; H04L 5/0035; H04L 5/003; H04L 5/0048; H04L 5/0055; H04L 5/0057; H04L 5/0094; H04L 27/26; H04L 1/1854; H04L 1/1864; H04J 11/0046
USPC ........................................................ 455/518
See application file for complete search history.

(56) References Cited

U.S. PATENT DOCUMENTS

| | | |
|---|---|---|
| 2015/0117377 A1 | 4/2015 | Maaref et al. |
| 2019/0020527 A1 | 1/2019 | Lei et al. |
| 2020/0100263 A1 | 3/2020 | Gupta et al. |
| 2022/0131642 A1* | 4/2022 | Kim ...................... H04L 5/0053 |

OTHER PUBLICATIONS

Partial International Search Report—PCT/US2021/040105—ISA/EPO—dated Oct. 21, 2021.

\* cited by examiner

Example: Virtual UE
including UE A, UE B and UE C

Option 1: CSI is represented by virtual UE group

Option 2: CSI for each UE may be a function of other UEs scheduling

_US 11,889,585 B2_

FORMING A VIRTUAL USER EQUIPMENT GROUP AND ENHANCING COMMUNICATION USING JOINT RECEPTION AND TRANSMISSION MECHANISMS

CROSS-REFERENCE TO RELATED APPLICATION

This application claims benefit of and priority to U.S. Provisional Patent Application No. 63/047,046, filed Jul. 1, 2020, which is assigned to the assignee hereof and herein incorporated by reference in its entirety as if fully set forth below and for all applicable purposes.

BACKGROUND

Field of the Disclosure

Aspects of the present disclosure relate to wireless communications, and more particularly, to techniques of forming a virtual user equipment group for enhanced communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved communications between access, Certain aspects provide a method for wireless communication by a user equipment (UE). The method generally includes establishing sidelink channels for communications between the UE and one or more other UEs, wherein the UE and other UEs form a virtual UE group; exchanging information with the other UEs in the virtual UE group to enhance communications between the one or more UEs of the virtual UE group and a network entity, wherein the information exchanged depends on at least one of a joint reception mechanism or joint transmission mechanism used by the virtual UE group; and communicating with the network entity based, at least in part, on the exchanged information.

Certain aspects provide a method for wireless communication by a network entity. The method generally includes sending, to at least one UE of a virtual UE group, a downlink control information (DCI) that schedules at least one of an uplink transmission from the virtual UE group or a downlink transmission to the virtual UE group, wherein information provided in the DCI depends on at least one of a joint reception mechanism or joint transmission mechanism used by the virtual UE group; and communicating with the virtual UE group in accordance with the DCI.

Certain aspects provide means for, apparatus, and/or computer readable medium having computer executable code stored thereon, for techniques described herein for forming a virtual user equipment group and enhancing communication using joint reception and transmission mechanisms.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
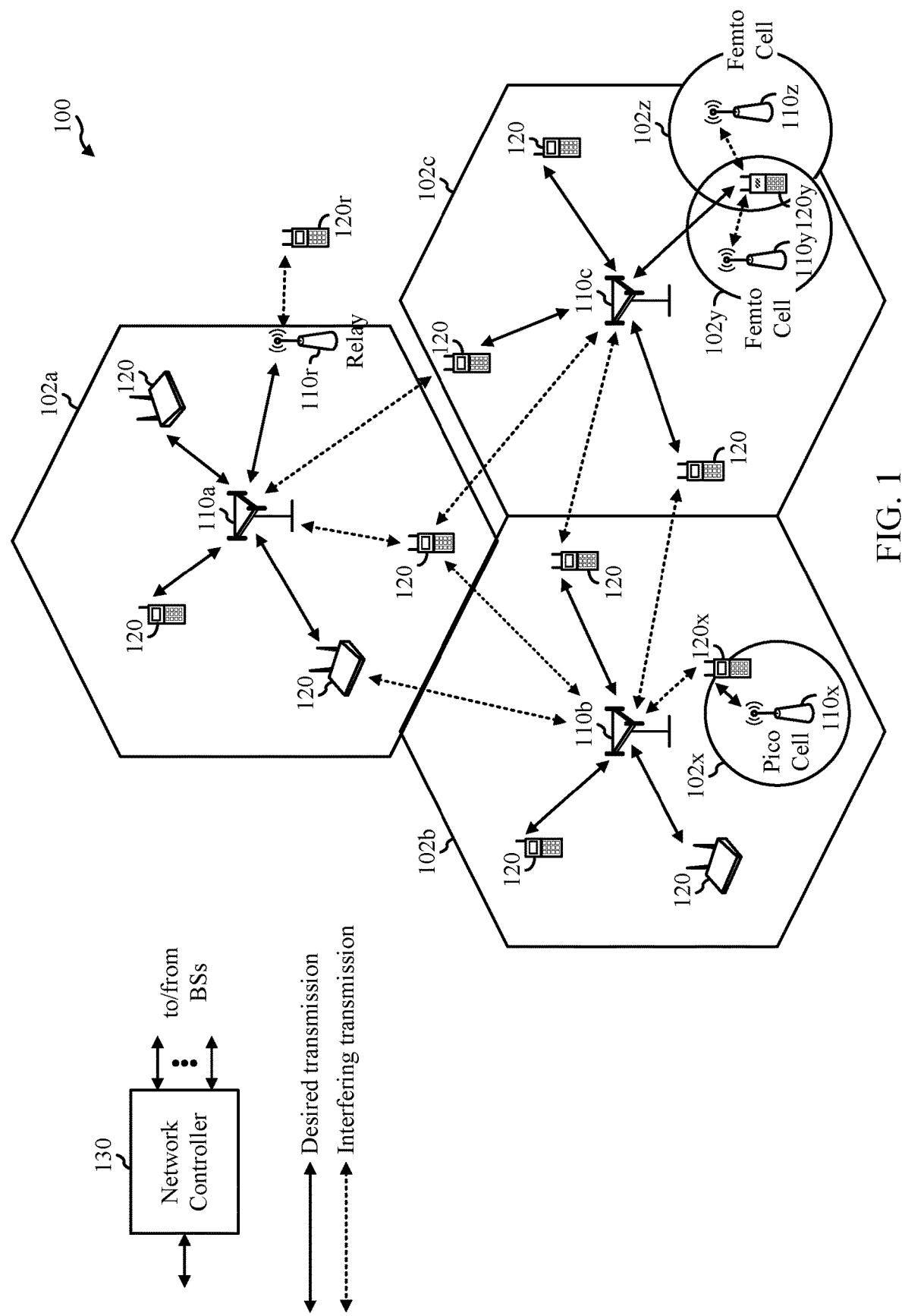
FIG. 1 is a block diagram conceptually illustrating an example telecommunications system, in accordance with certain aspects of the present disclosure.

Aspects of the present disclosure provide apparatus, methods, processing systems, and computer readable mediums for forming a virtual user equipment (UE) group and enhancing communication using joint reception and transmission mechanisms. For example, a UE may establish sidelink channels for communications with one or more other UEs. The UE and the one or more other UEs may form a virtual UE group (also interchangeably referred to as a virtual UE) using the sidelink channels. The UE may exchange information with other UEs in the virtual UE group to enhance communications between the one or more UEs of the virtual UE group and a network entity. The information exchanged depends on at least one of a joint reception mechanism or a joint transmission mechanism used by the virtual UE group. The UE communicates with the network entity based, at least in part, on the exchanged information.

The virtual UE group can thus benefit from a larger, aggregated, number of antennas and the corresponding increased data rate. In this way, the virtual UE group can reduce or eliminate the limitations of each individual UE. In some cases, the UE in a virtual UE group may generally be similar, exchangeable, or replaceable during operation, from the perspective of signaling with the network. That is, certain features or limitations of individual UEs are not required or needed for the overall operations by the virtual UE group, as the aggregated, synergistic effect of the sidelink virtual UE group does not rely on any particular powerful or capable UE to aid another less capable UE. For example, according to the present disclosure, the virtual UE group as a whole via sidelink communications may remedy particular limitations of any particular UE therein, and does not rely on a specific, capable UE to enable the performance of the virtual UE group. When communicating with a base station, the virtual UE group behaves as a coherent and single entity, and not relying on any particular UE in the virtual UE group.

In some cases, the UEs in a formed virtual UE group may, due to movement or other factors that change channel conditions, leave the formed virtual UE group and join another virtual UE group via sidelink. The formed virtual UE group may also accept outside UEs when certain conditions are met (such as the conditions based on which the current virtual UE group is formed). For example, when the virtual UE group includes three or more fungible UEs, when one UE (i.e., any one of the three or more UEs in the virtual UE group) leaves the virtual UE group, the virtual UE group may continue to operate by aggregating the capabilities of the remaining two or more UEs. On the other hand, when an outsider UE joins the virtual UE group, the outsider UE may contribute to, but not take over, signaling aspects of the formed virtual UE group.

In some cases, the formation of the virtual UE group employs various features in 5G NR sidelink communication, such as low end-to-end latency and high reliability. For example, the sidelink communication used to form the virtual UE group may have periodic, or aperiodic ultra-reliable low latency traffic that can be of high density. The UE to UE messages may include various cast types, such as broadcast, groupcast, or unicast. The sidelink communication supports dynamic, semi-persistent scheduling (SPS), or sensing based resource selection. Within the virtual UE group, the UEs may communicate over PC5 links and operate in one of two modes. In a first mode (Mode 1), RAN schedules sidelink resources; in a second mode (Mode 2), sidelink UE autonomously selects resources from a pre-configured or RAN signaled resource set.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 may be configured to perform operations 800 of FIG. 8 to function as part of a virtual UE group and communicate with BSs 110, while BSs 110 may perform operations 900 of FIG. 9 to communicate with the virtual UE group.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
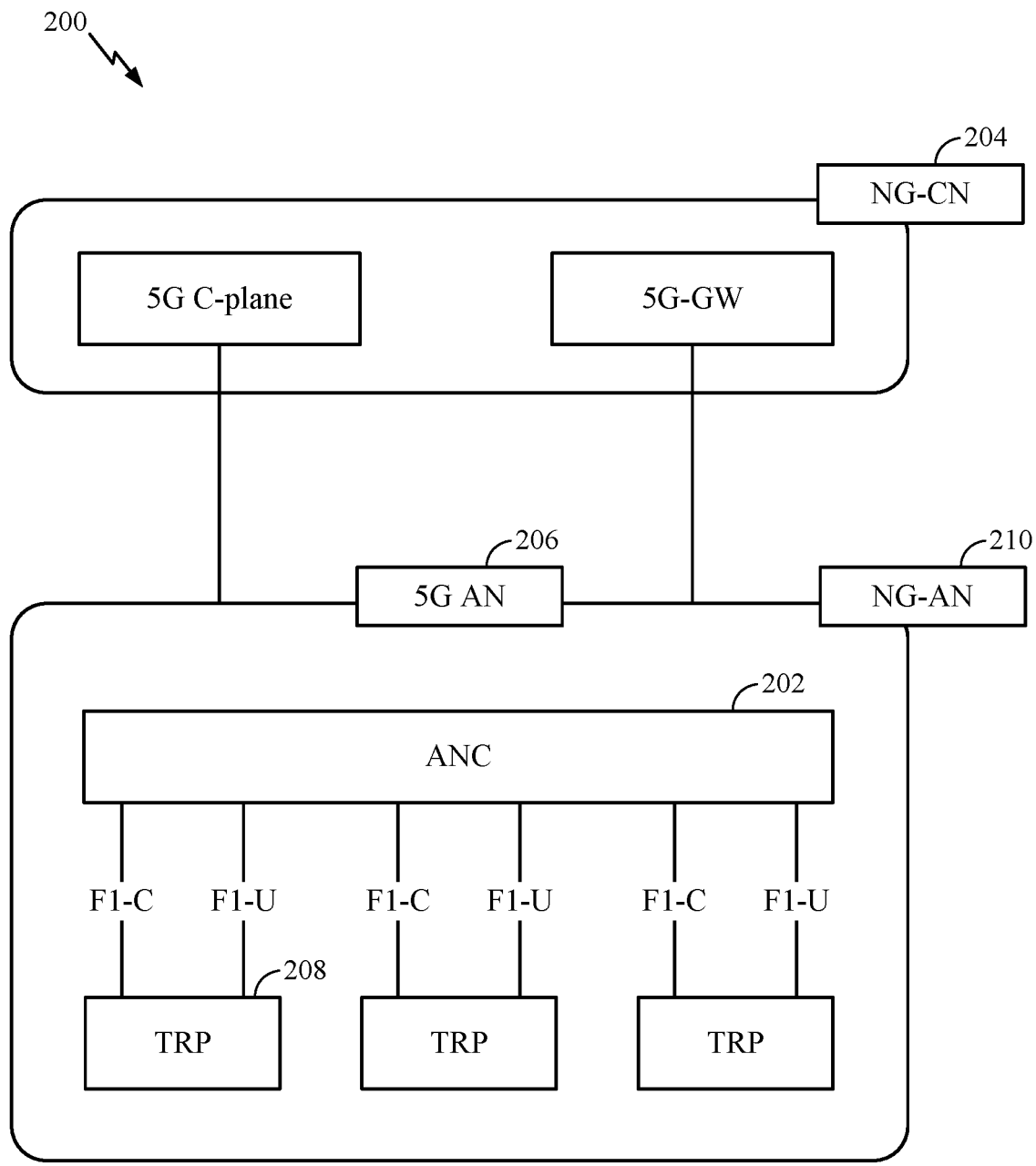
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
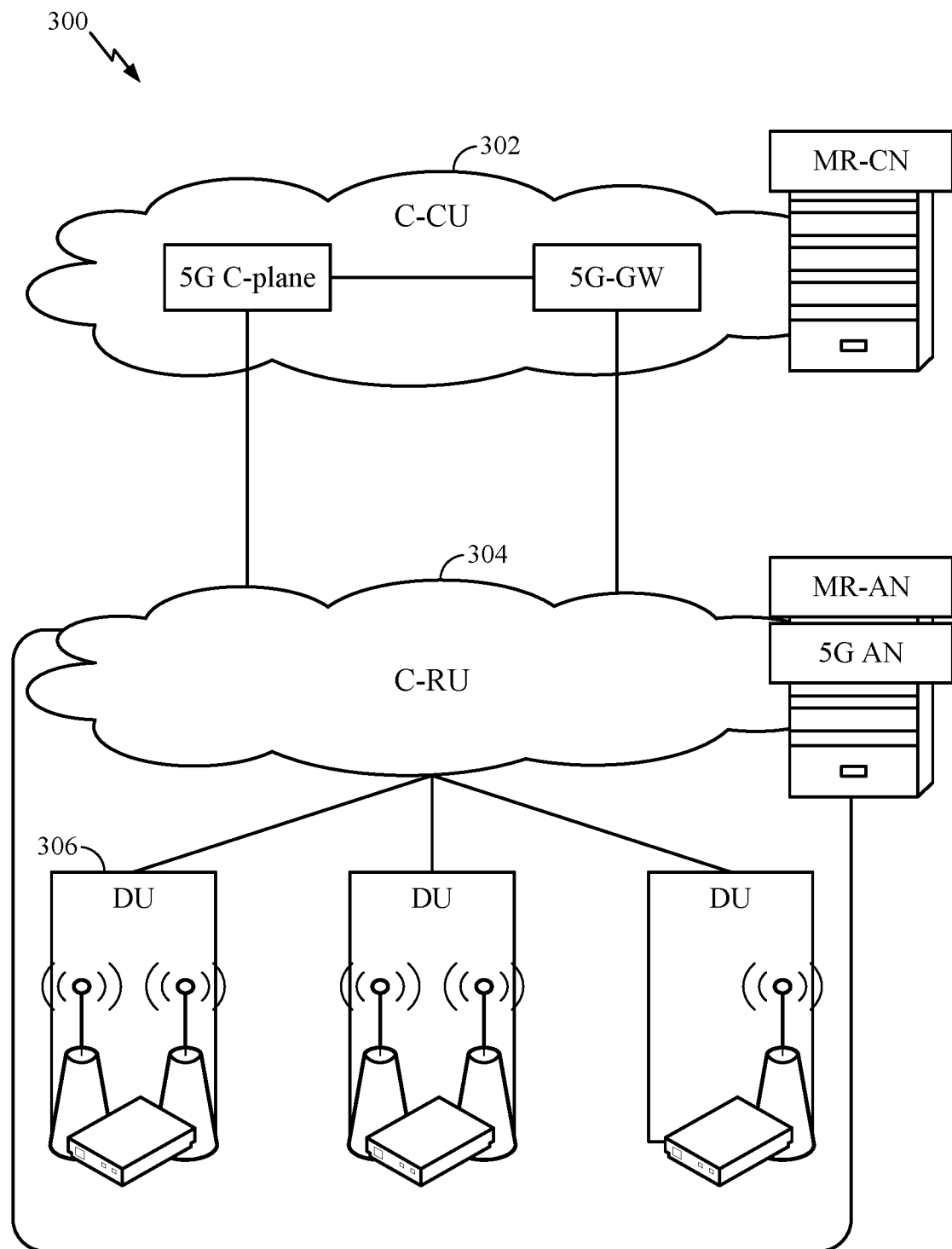
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
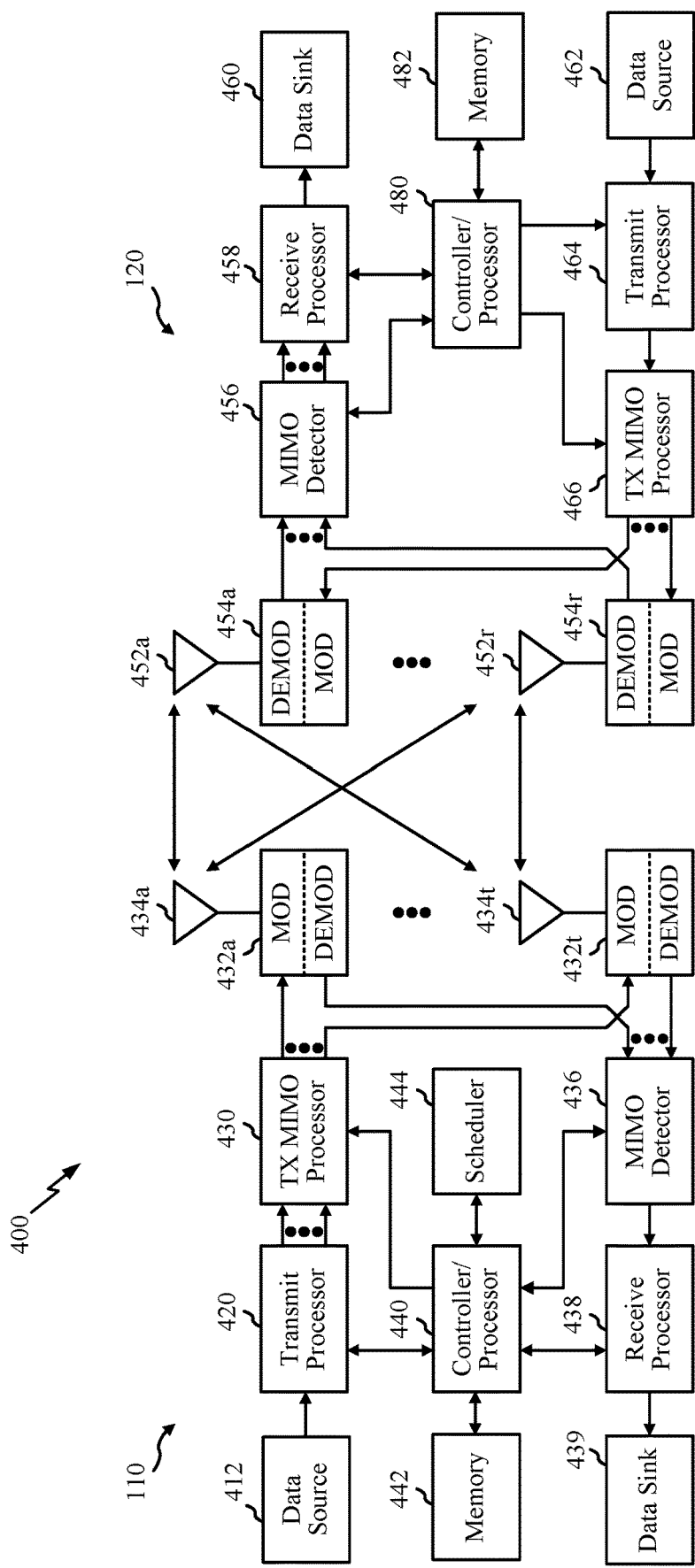
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may perform (or be used to perform) operations 800 of FIG. 8. Similarly, antennas 434, processors 420, 430, 438, and/or controller/processor 440 of the BS 110 may perform (or be used to perform) operations 900 of FIG. 9.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 5:
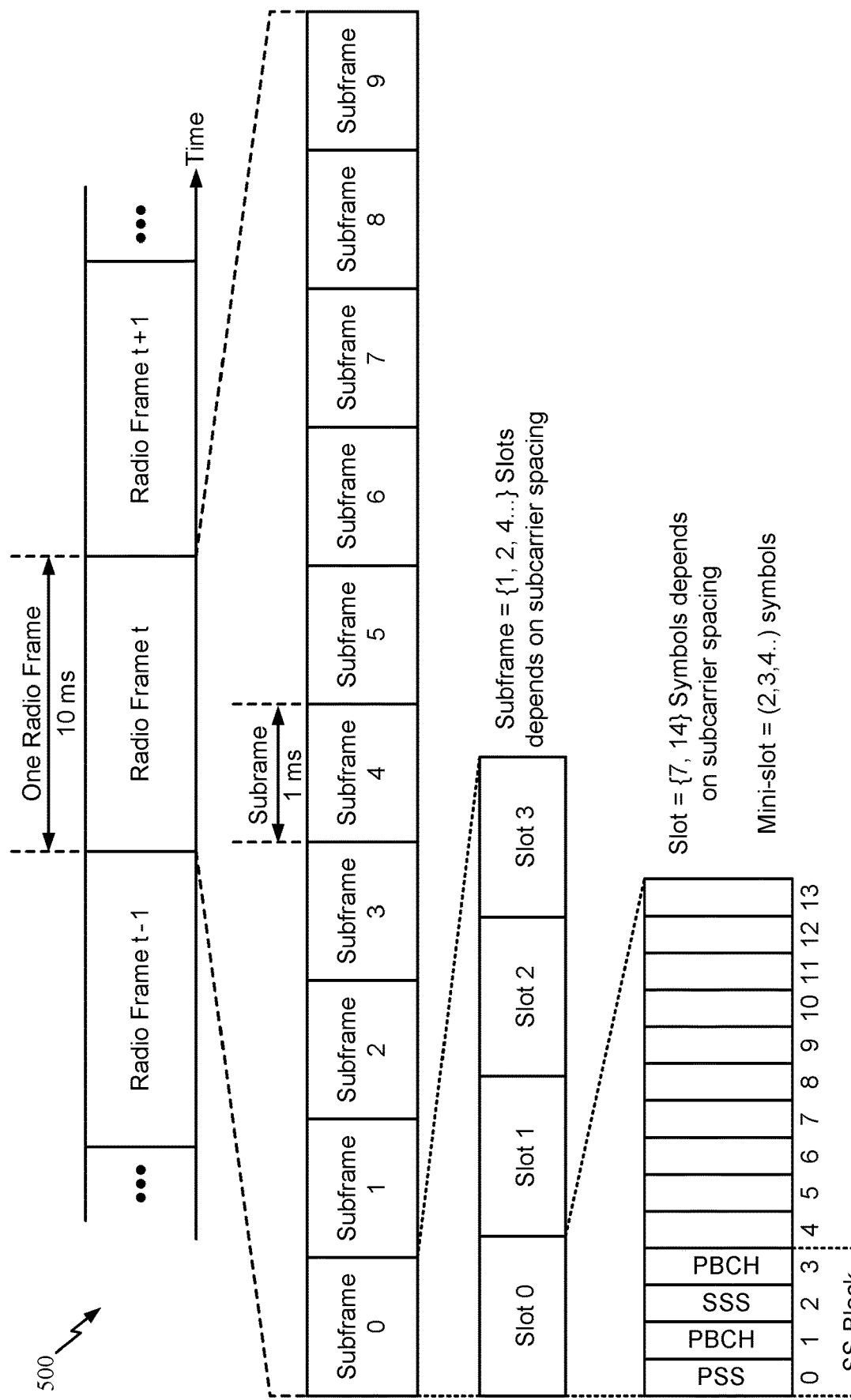
FIG. 5 illustrates an example of a frame format for a new radio (NR) system, in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Coordinated Multi-point (CoMP) and Cell Virtualization

Figure 6A:
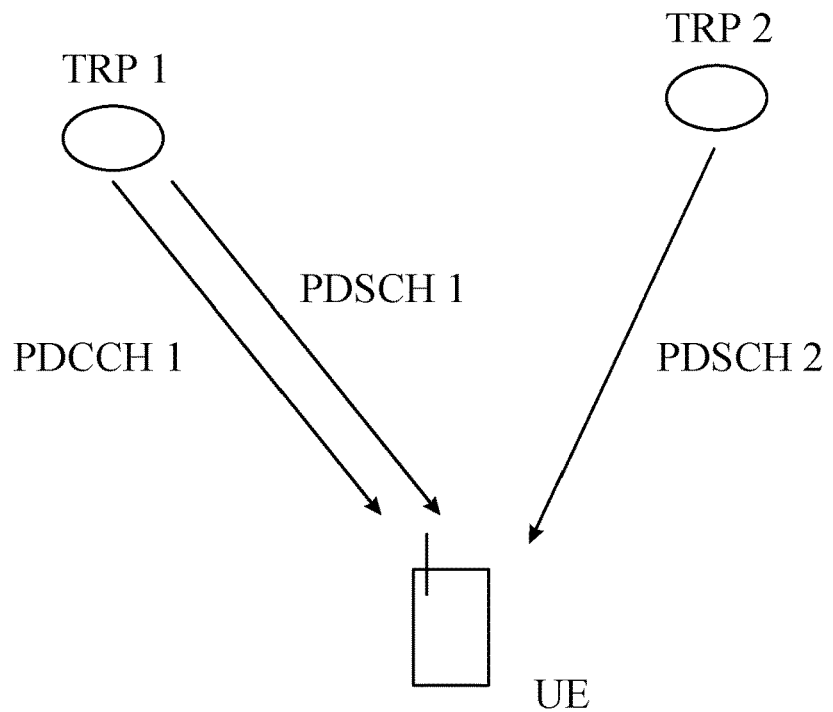
FIGS. 6A and 6B illustrate diagrams of example scenarios of multiple transmission reception points (multi-TRPs) sending downlink transmissions, in accordance with certain aspects of the present disclosure.
Figure 6B:
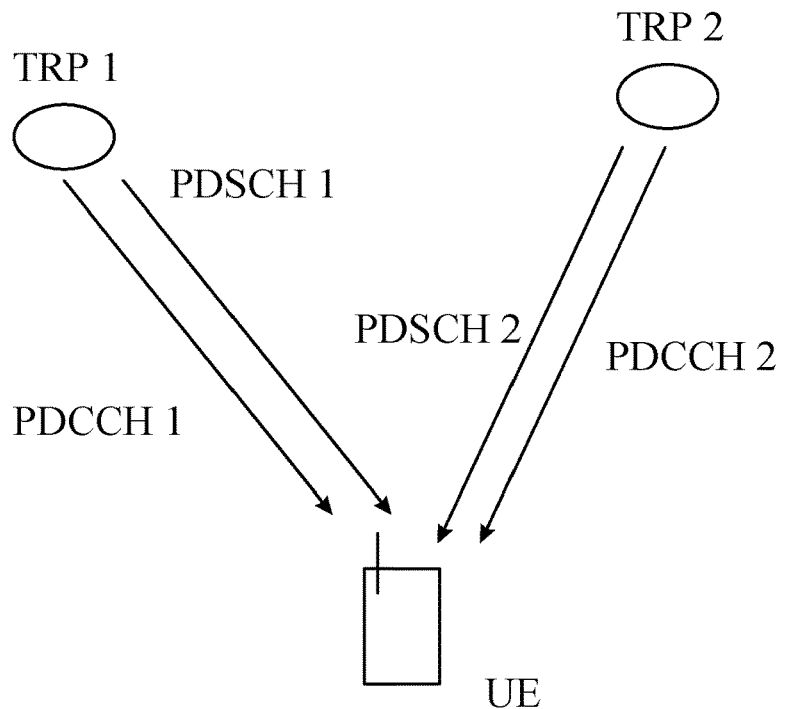

In some scenarios, NR networks are expected to utilize multiple transmission and reception points (TRPs) to improve reliability and capacity performance through flexible deployment scenarios. For example, allowing UEs to access wireless networks via multi-TRPs may help support increased mobile data traffic and enhance the coverage. Multi-TRPs may be used to implement one or more macro-cells, small cells, pico-cells, or femto-cells, and may include remote radio heads, relay nodes, and the like. FIGS. 6A and 6B illustrate respective example multi-TRP scenarios. In both FIGS. 6A and 6B, two TRPs (TRP 1 and TRP 2) serve a UE. FIG. 6A illustrates to a single-DCI based scenario. FIG. 6B illustrates a multi-DCI based scenario.

As shown in FIG. 6A, for multi-TRP transmission, single PDCCH (e.g., from one of the multiple TRPs) may be used for scheduling. The PDCCH may include downlink control information (DCI). The UE receives PDCCH1 and PDSCH1 from TRP1, and receives only PDSCH2 from TRP2. Such single-DCI based configuration is applicable to ideal backhaul, or backhaul with small delay. Furthermore, different PDSCH schemes for robustness may be used, such as SDM, frequency division multiplexed (FDM), time division multiplexed (TDM), or single frequency network (SFN). Some examples are described below.

As shown in FIG. 6B, for multi-TRP transmission, multiple PDCCHs (each transmitted from a different one of the multiple TRPs) may be used for scheduling. Each PDCCH may include corresponding DCI. For example, PDCCH1 (transmitted from TRP 1) may carry a first DCI that schedules a first codeword (CW1) to be transmitted from TRP1 in PDSCH1. Similarly, PDCCH2 (transmitted from TRP2) may carry a second DCI that schedules a second codeword (CW2) to be transmitted from TRP2 in PDSCH2. Such multi-DCI configuration may be applicable to ideal or non-ideal backhaul. For example, the UE monitors PDCCH from respective TRP.

For monitoring the DCIs transmitted from different TRPs, a number of different control resource sets (CORESETs) may be used. As used herein, the term CORESET generally refers to a set of physical resources (e.g., a specific area on the NR Downlink Resource Grid) and a set of parameters that is used to carry PDCCH/DCI. For example, a CORESET may by similar in area to an LTE PDCCH area (e.g., the first 1,2,3,4 OFDM symbols in a subframe).

In some cases, TRP differentiation at the UE side may be based on CORESET groups. CORESET groups may be defined by higher layer signaling of an index per CORESET which can be used to group the CORESETs. For example, for 2 CORESET groups, two indexes may be used (i.e. index=0 and index=1). Thus, a UE may monitor for transmissions in different CORESET groups and infer that transmissions sent in different CORESET groups come from different TRPs. There may be other ways in which the notion of different TRPs may be transparent to the UE.

In some aspects, DL CoMP transmission can be classified into three categories: (1) transparent coherent joint transmission (CJT); (2) transparent non-coherent joint transmission (NCJT); and (3) non-transparent non-coherent joint transmission. In CJT, TRPs need to exchange payload, DL channel state information, and maintain tight phase synchronization. In NCJT, TRPs need to exchange payload and scheduling information. Usually, FeCoMP and multi-TRP are non-transparent NCJT CoMP schemes.

There are various multi-TRP based transmission schemes currently supported (e.g., in Rel-16). For example, NCJT may be applied to both URLLC and non-URLLC transmissions. In this case, a first set of layers is transmitted from a first TRP (TRP1), while a second set of layers is transmitted from a second TRP (TRP2).

For multi-DCI based NCJT, a first code word (CW1) is mapped to the first set of layers, while a second code word (CW2) is mapped to a second set of layers. For single-DCI based NCJT, a single CW is mapped to both the first and second sets of layers. The same resources are allocated to TRP1 and TRP2. The rank-pair applied to TRP1 and TRP2 are 1+1, 1+2, 2+1 and 2+2.

An FDM multi-TRP scheme may be applied to URLLC. In this case, a same rank applies to transmission from TRP1 and TRP2. Different frequency resources may be allocated for each TRP. For example, for a wideband (WB) precoding resource block group (PRG), a first half total of the frequency domain resource allocation (FDRA) resources may be allocated to TRP1, while the second half may be allocated to TRP2. For subband PRGs (e.g., spanning 2 or 4 PRBs), even PRG(s) may be allocated to TRP1 and odd PRG(s) may be allocated to TRP2.

For the FDM scheme, different CW-to-layer mapping schemes may be used. According to a first scheme (Scheme 2a), a transport block size (TBS) may be determined using full resources of TRP1 and TRP2, with a same redundancy version (RV) mapped across full resources and layers of TRP1 and TRP2. According to a second scheme (Scheme 2b), TBS may be determined using a resource allocation (RA) of each TRP, with a same or different RV mapped to the RA and layers of TRP1 and TRP2.

A TDM multi-TRP scheme may also be applied to URLLC. In this case, a same rank may be applied to transmission from TRP1 and TRP2. A same FDRA with different time division resource allocations (TDRAs), in terms of mini-slots may be applied, with each mini-slot (Tx occasion) corresponding to one TRP. For the TDM scheme, a single CW may be mapped to each Tx occasion with a specific RV.

Figure 7:
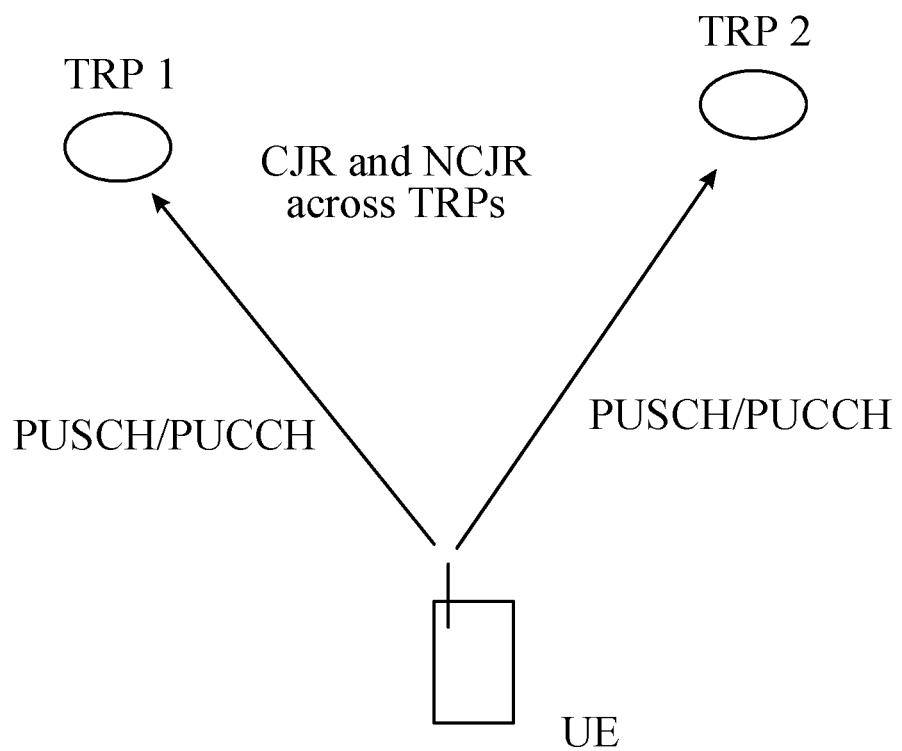
FIG. 7 illustrates a diagram of an example multi-TRPs receiving uplink transmission scenario, in accordance with certain aspects of the present disclosure.

FIG. 7 illustrates a diagram of an example multi-TRP receiving uplink transmission scenario. As shown, TRP 1 and TRP 2 receives respective PUSCH or PUCCH (or both) from the UE. In general, UL CoMP reception may be realized by gNB implementation. Depending on backhaul capacity, multiple UL CoMP implementation schemes may be implemented. For example, some in-phase and quadrature (I-Q) samples may be transferred across the multi-TRPs. Such transfer may allow TRPs to perform coherent joint detection. As shown in FIG. 7, transparent coherent joint reception (CJR) and transparent non-coherent joint reception (NCJR) across the multiple TRPs may be performed.

In some examples, soft logarithmic likelihood ratio (LLR) bits may transfer across multi-TRPs. This allows the multi-TRPs to perform LLR combining. In other examples, decoded bits transfer may be performed. Each of the multi-TRPs performs decoding. The multi-TRPs then perform selection combining based on the individual decoding of each TRP. In some cases, the link adaptation at gNB can reflect its own implementation. In some cases, the UL transmission for a given channel may span multiple TCI states to realize better spatial diversity and reliability Example Signaling Aspects on User Equipment Virtualization Aspects of the present disclosure relate to wireless communications, and more particularly, to techniques for forming a virtual user equipment (UE) group for communication. UE cooperation allows for efficient use of available resources without costly additional network infrastructure improvements. Such UE cooperation can be achieved by interconnecting UEs using sidelink channels.

Tightly interconnected UEs can form a virtual UE group that uses a joint reception mechanism, a joint transmission mechanism, or both to communicate with one or more network entities. The virtual UE group enhances communications between an individual UE in the virtual UE group and the one or more network entities. The individual UE exchange information with other UEs in the virtual UE group based on at least one of the joint reception mechanism or the joint transmission mechanism. The UE communicates with the one or more network entity based on the exchanged information. In some cases, the joint reception mechanism or the joint transmission mechanism enables two or more UEs in the virtual UE group to communicate with network entities and perform joint processing, for example, such that the two or more UEs need not rely on another UE in the virtual UE group in terms of input and output. The virtual UE group may facilitate the joint reception and transmission by aggregating the capacities of the UEs in the virtual UE group, while allowing the UEs to leave the virtual UE group (e.g., due to movement) and outside UEs to join the virtual UE group dynamically.

For example, in forming the virtual UE group, the UEs may be within the minimum communication range for sidelink HARQ feedback in physical sidelink feedback channel (PSFCH). The minimum communication range may be specified along with quality of service (QoS) as a Transmitter-Receiver (TX-RX) distance to maintain certain reliability of a groupcast packet transmitted from higher layer(s). The UEs may perform sidelink adaptation by using feedback of channel quality information (CQI) from the RX UE. The RX UE may transmit the PSFCH for unicast and groupcast, by conveying 1 bit information over 1 RB for the HARQ ACK and NACK. For certain cooperation modes, the CQI may depend on the sidelink data throughput. In addition, channel state information (CSI) may be carried in the MAC CE. The CSI may be different in different cooperation modes (i.e., Mode 1 and Mode 2).

Aspects of the present disclosure may take advantage of recent growth in the number of active mobile devices that provides hardware foundation to achieve wireless access virtualization at the UE level. This hardware foundation, for example, provides wireless sidelink communication to enable inter-UE cooperation. As will be described in greater detail below, multiple UEs may team up (cooperate) to form a virtual UE for enhancing capabilities, such as improving resource allocation efficiency and coordinating network performance. Aspects of the present disclosure provides techniques for forming such a virtual UE group by interconnecting UEs and signaling mechanisms used to enhance communications with one or more network entities (e.g., multi-TRPs).

Conventional sidelink communication concerns information exchange between two or more UEs while the behavior of the group of interconnected UEs is disregarded or underutilized. By having multiple UEs share information proactively as one virtual UE, the group of UEs may remedy the weaknesses (such as a low signal to noise ratio) of some UEs in the group. In general, UEs approximate to each other (e.g., within a threshold) may form a virtual UE group. The limitations of each individual UE are typically defined by the respective form factors (i.e., limited number of antennas). The virtual UE group can thus benefit from a larger, aggregated, number of antennas and the corresponding increased data rate. In this way, the virtual UE group can reduce or eliminate the limitations of each individual UE.

Figure 8:
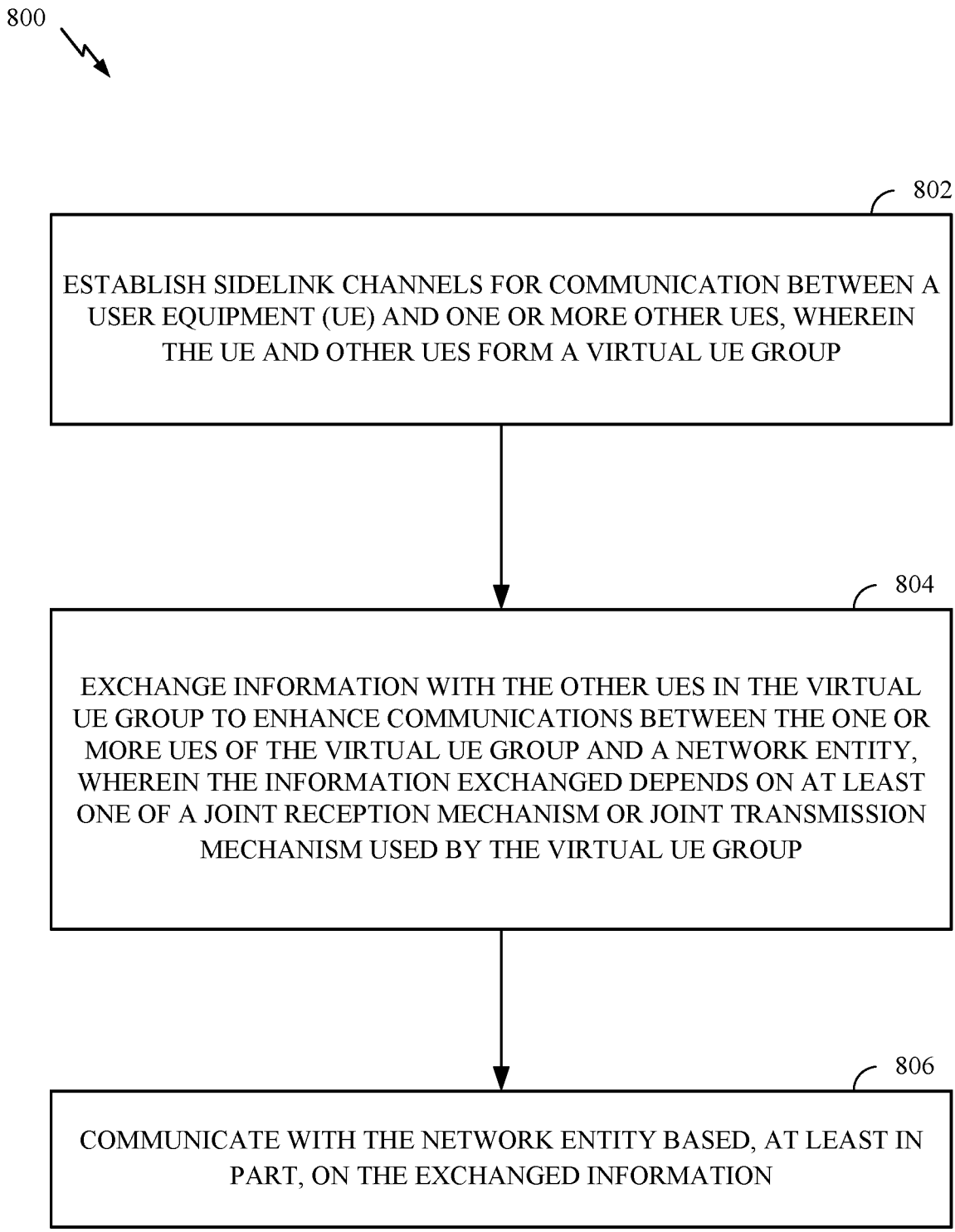
FIG. 8 illustrates example operations that may be performed by a virtual UE, in accordance with certain aspects of the present disclosure.

FIG. 8 is a flow diagram illustrating example operations 800 for wireless communications, in accordance with certain aspects of the present disclosure. The operations 800 may be performed, for example, by a UE (e.g., such as a UE 120 in the wireless communication network 100) to form a virtual UE group with one or more other UEs and to communicate with one or more network entities.

Operations 800 begin, at 802, by establishing sidelink channels for communications between the UE and one or more other UEs. The UE and the one or more other UEs form a virtual UE group. For example, referring to FIG. 10, the UE A, UE B, and UE C, via sidelink communications, form a virtual UE that takes advantage of the combined form factors of the three UEs.

At 804, the UE exchange information with the other UEs in the virtual UE group to enhance communications between the one or more UEs of the virtual UE group and a network entity. The information exchanged depends on at least one of a joint reception mechanism or a joint transmission mechanism used by the virtual UE group. At 806, the UE communicates with the network entity based, at least in part, on the exchanged information.

Figure 9:
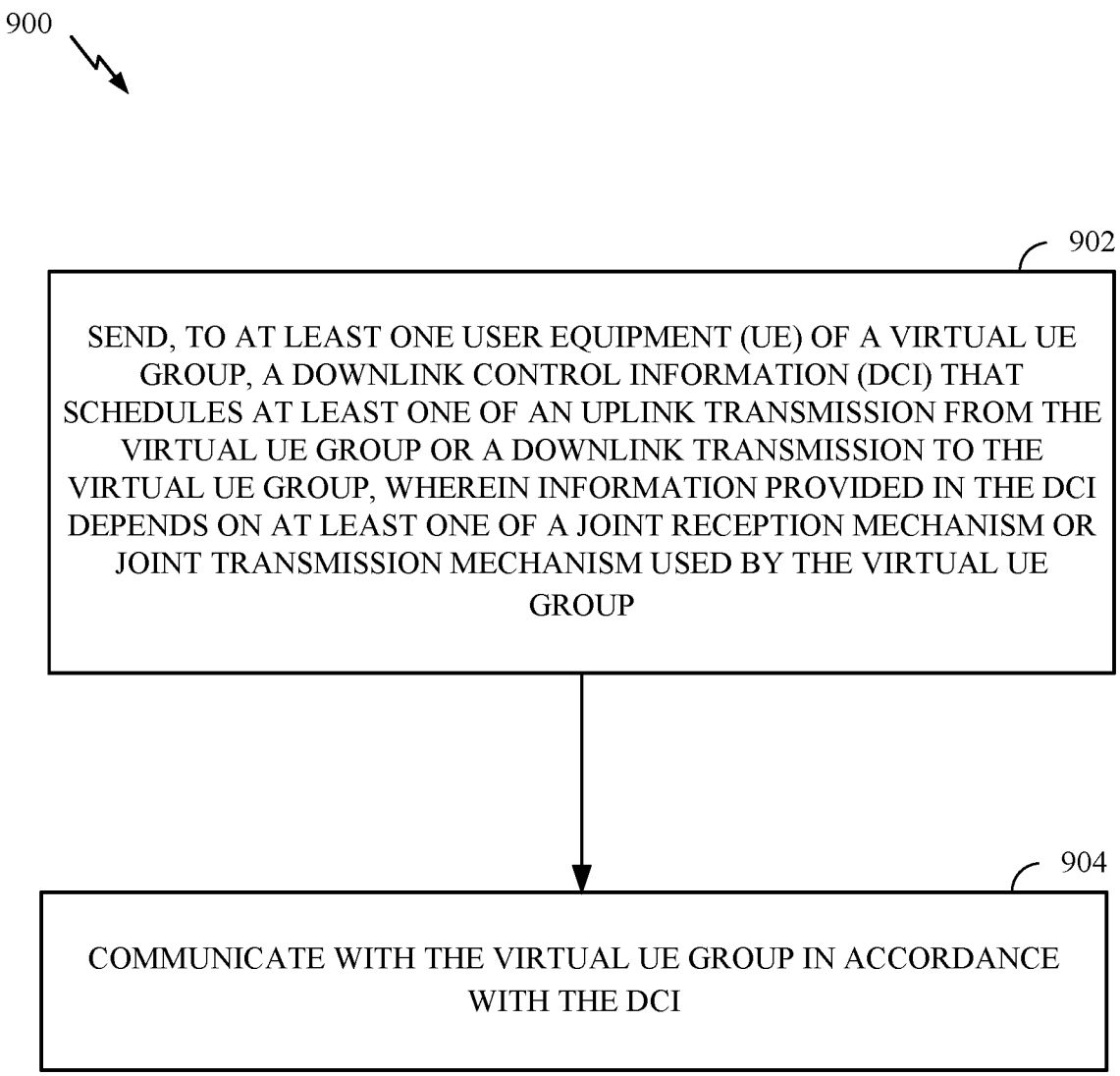
FIG. 9 illustrates example operations that may be performed by a network entity, in accordance with certain aspects of the present disclosure.

FIG. 9 is a flow diagram illustrating example operations 900 for wireless communications that may be considered complementary to operations 800 of FIG. 8. For example, operations 900 may be performed by a network entity (e.g., such as a BS 110 in the wireless communication network 100) or TRP(s), such as multi-TRPs, to communicate with a UE (performing operations 800 of FIG. 8) and its associated virtual UE group.

Operations 900 begin, at 902, by sending, to at least one UE of a virtual UE group, a DCI that schedules at least one of an uplink transmission from the virtual UE group or a downlink transmission to the virtual UE group. The information provided in the DCI depends on at least one of a joint reception mechanism or joint transmission mechanism used by the virtual UE group. The virtual UE group is formed by two or more UEs interconnected on sidelink channels and exchanging information based at least on one of the joint reception mechanism or the joint transmission mechanism. At 904, the network entity communicates with the virtual UE group in accordance with the DCI.

Operations 800 and 900 of FIGS. 8 and 9 may be understood with reference to various examples shown in FIGS. 10-15 and described below.

Figure 10:
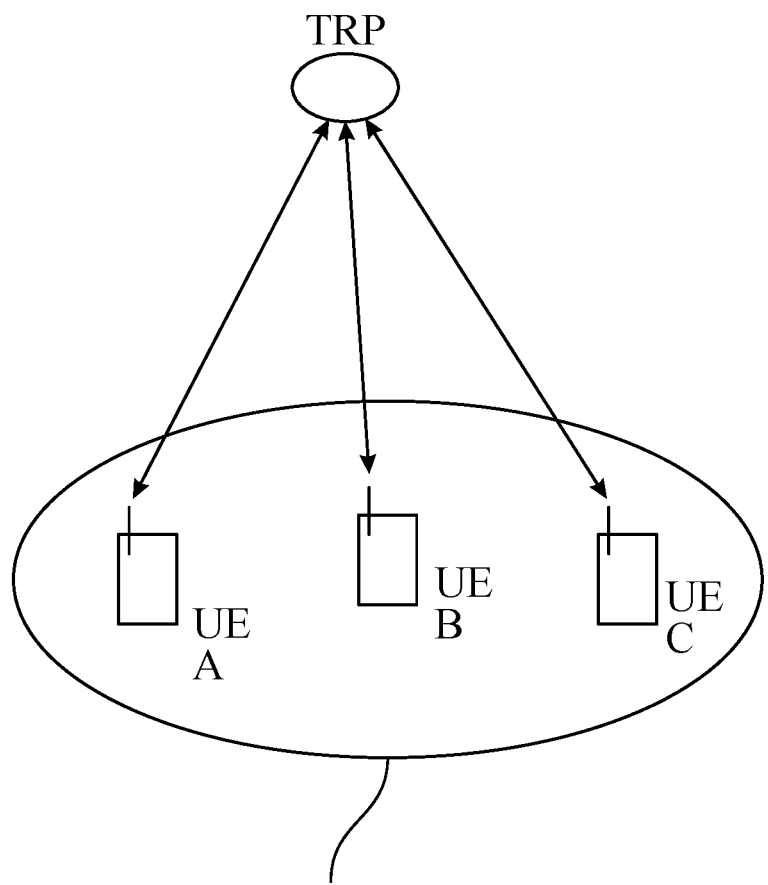
FIG. 10 illustrates an example virtual UE formed by multiple UEs receiving downlink transmissions from a TRP, in accordance with certain aspects of the present disclosure.

FIG. 10 illustrates an example virtual UE formed by multiple UEs (i.e., UE A, UE B, and UE C) receiving downlink transmissions from a single TRP. In some cases, the example virtual UE may be referred to as a virtual UE group interchangeably. The virtual UE communicates with the TRP by taking advantage of respective connections (e.g., aggregating antennas performance) of the multiple UEs. Throughout this disclosure, although some arrows are used to indicate specific signaling between the TRP and the virtual UE (or specific UEs), such illustration does not preclude two-way communications between the TRP and the virtual UE (or specific UEs).

In some examples, the multiple UEs of the virtual UE group may perform in-phase and quadrature (I-Q) samples transfer across UEs. In this case, the joint reception mechanism includes a coherent joint detection mechanism. The UE exchange information with other UEs in the virtual UE group and the information exchanged includes I-Q samples taken for downlink transmissions. The level of I-Q samples transfer across UEs may depend on the sidelink capacity of the UEs within the virtual UE group. As such, the multiple UEs of the virtual UE group can perform coherent joint detection.

In some other examples, the joint reception mechanism includes a non-coherent joint detection mechanism. The UE exchanges information with other UEs in the virtual UE group and the information exchanged includes at least one of LLRs or decoded bits generated for downlink transmission. The soft LLR bits may be transferred across the UEs of the virtual UE group. This allows multiple UEs to perform LLR selection combining. In some cases, multiple UEs of the virtual UE group perform decoding. The LLR selection combining is performed after the group decoding and after the decoded bits are transferred to the target UE (e.g., one of the UE A, UE B, and UE C, to perform the LLR selection combining). In such cases, better diversity and signal to noise ratio can be achieved with LLR and decoded payload transfer, allowing the coherent joint detection to further increase the multiplexing gain.

Figure 11:
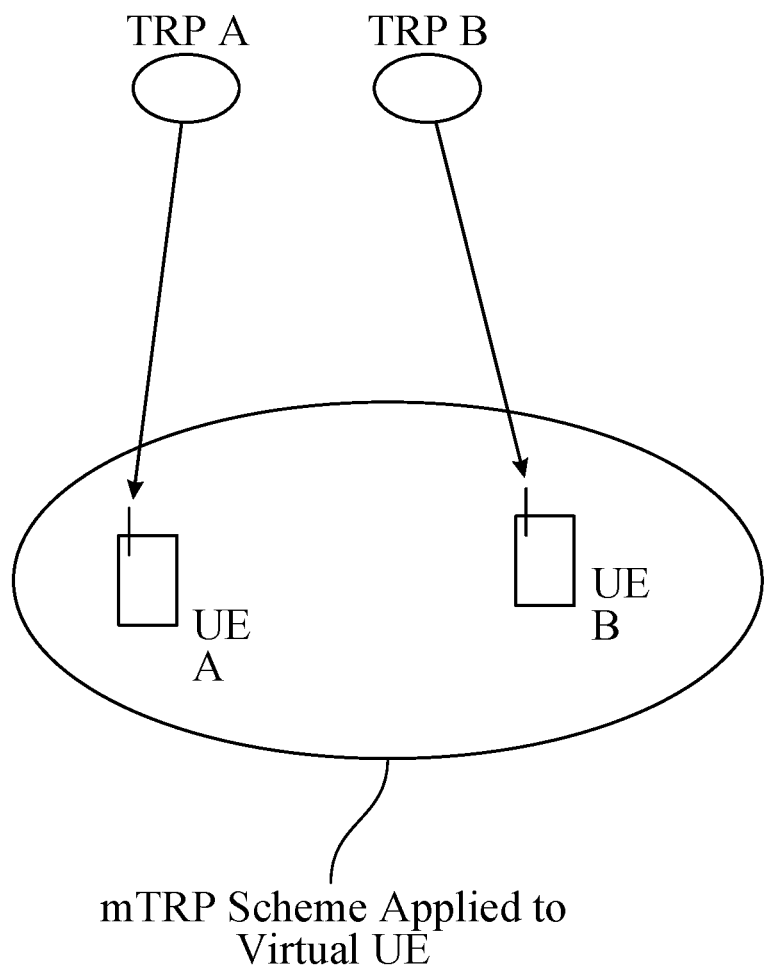
FIG. 11 illustrates an example virtual UE formed by multiple UEs receiving downlink transmissions from multi-TRPs, in accordance with certain aspects of the present disclosure.

FIG. 11 illustrates an example virtual UE including multiple UEs receiving downlink transmissions from multi-TRPs.

As shown, the virtual UE group formed by UE A and UE B receives downlink communications respectively from TRP A and TRP B. For example, when analog beams are used, a single TRP transmission may not be able to be received by multiple UEs in the virtual group simultaneously. Thus, a multi-TRP scheme may apply to a virtual UE group, having respective TRP downlink receptions performed by respective UEs of the virtual UE group. For example, various downlink transmission schemes for multi-TRPs, such as SDM, FDM, TDM, and SFN, may be equally applicable to virtual UEs. Such downlink transmission schemes may apply to both PDCCH and PDSCH.

In some cases, the UE provides channel state information (CSI) feedback to the network entity. The UE receives at least one PDSCH transmission from the network entity in accordance with the CSI feedback. In some examples, the at least one PDSCH transmission is scheduled using at least one of TDM or FDM among UEs in the virtual UE group. In some cases, FDM may require the virtual UE group to process multiple transport blocks (TBs) simultaneously. The UE may provide updated CSI feedback to the network entity if the virtual UE group changes, such as adding or removing UEs of the virtual UE group when some UEs leave or enter the proximity of the virtual UE group. In case of a closed-loop CSI acquisition and utilization, as the CSI is updated, a separate outer-loop may be involved.

Figure 12A:
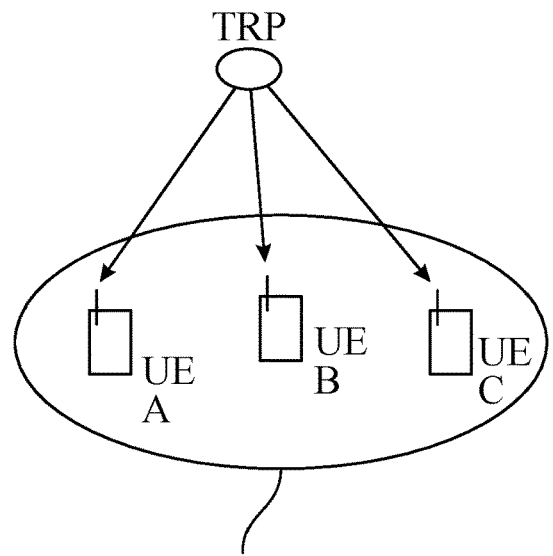
FIG. 12A illustrates an example channel state information (CSI) represented by a virtual UE formed by multiple UEs, in accordance with certain aspects of the present disclosure.
Figure 12B:
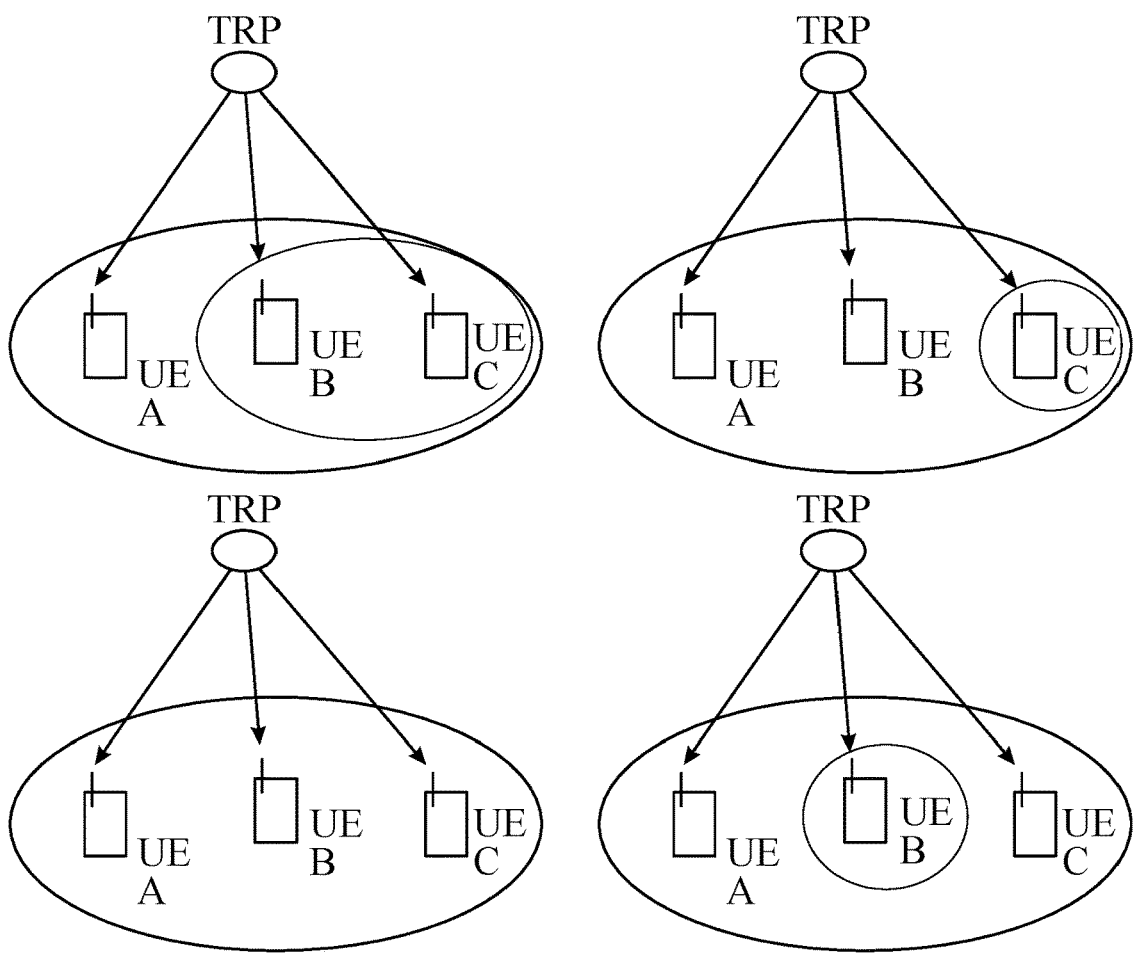
FIG. 12B illustrates example scenarios of sending CSI feedback for each UE as a function of the participation of other UEs, in accordance with certain aspects of the present disclosure.

FIGS. 12A and 12B illustrate various options for the virtual UE to provide such CSI feedback in relation with the UE. In a first option, as shown in FIG. 12A, the virtual UE group sends CSI on behalf of the UEs in the virtual UE group. In a second option, as shown in FIG. 12B, the CSI for each UE may be a function of other UEs' scheduling.

Turning first to FIG. 12A, an example CSI feedback from the perspective of the virtual UE group is shown. The CSI reflects the joint reception mechanism across all UEs in the virtual group. For example, when the network entity, such as a gNB, intends to send data to multiple UEs simultaneously on the same set of REs, the network entity may aggregate all the UEs' packets into the same medium access control (MAC) protocol data unit (PDU) and transmit to the virtual UE in a PDSCH transmission. In this case, each UE in the virtual UE group can still benefit with better link quality and higher multiplexing gain. Such configuration may require the UEs of the virtual UE group to decode a bigger packet size than a packet size without the virtual UE group.

FIG. 12B illustrates example scenarios of sending CSI feedback for each UE as a function of the participation of other UEs. Four examples are provided in FIG. 12B. At the upper left corner, the UE B and UE C together may help UE A in sending CSI feedback. At the upper right corner, the UE C alone helps UE A in sending CSI feedback. At the lower left corner, the UE A alone sends its own CSI feedback. At the lower right corner, the UE C alone helps UE A in sending CSI feedback. In these cases, the CSI feedback may vary depending on whether there are other UEs in the same virtual UE group being simultaneously scheduled on the same set of resource elements (REs) or not. For example, when there are other UEs in the same virtual UE group that are scheduled on the same set of REs, such as in the example shown in the upper left corner, the CSI feedback of UE A may need to feedback additional CSI to account for the cooperation for the UE B and/or UE C, when they are not receiving their own data. In some examples, separate outer-loop may be applied depending on the co-scheduled UEs within the same virtual UE group.

Figure 13:
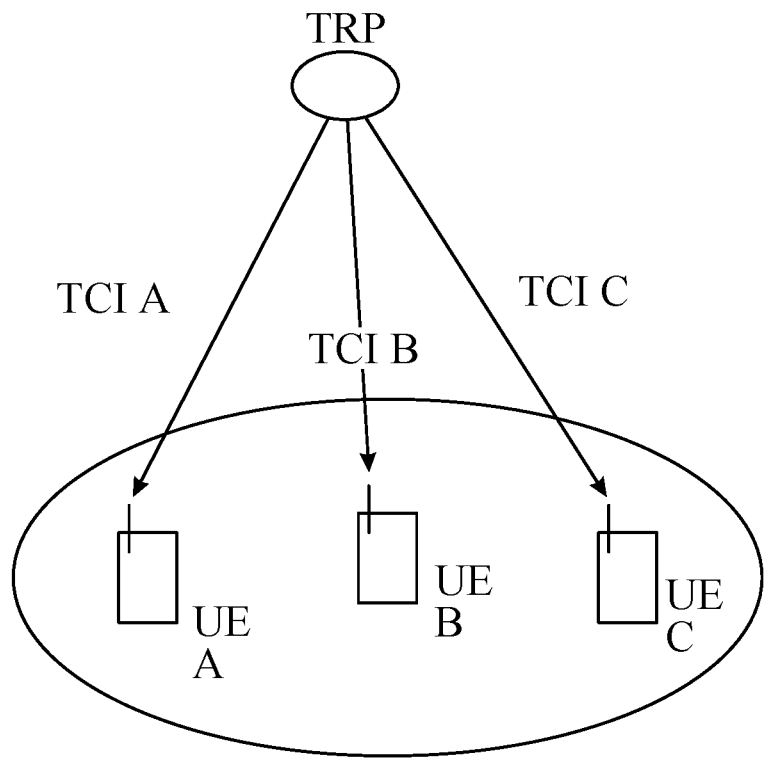
FIG. 13 illustrates examples of downlink PDCCH reception at a virtual UE formed by multiple UEs, in accordance with certain aspects of the present disclosure.
Figure 13:
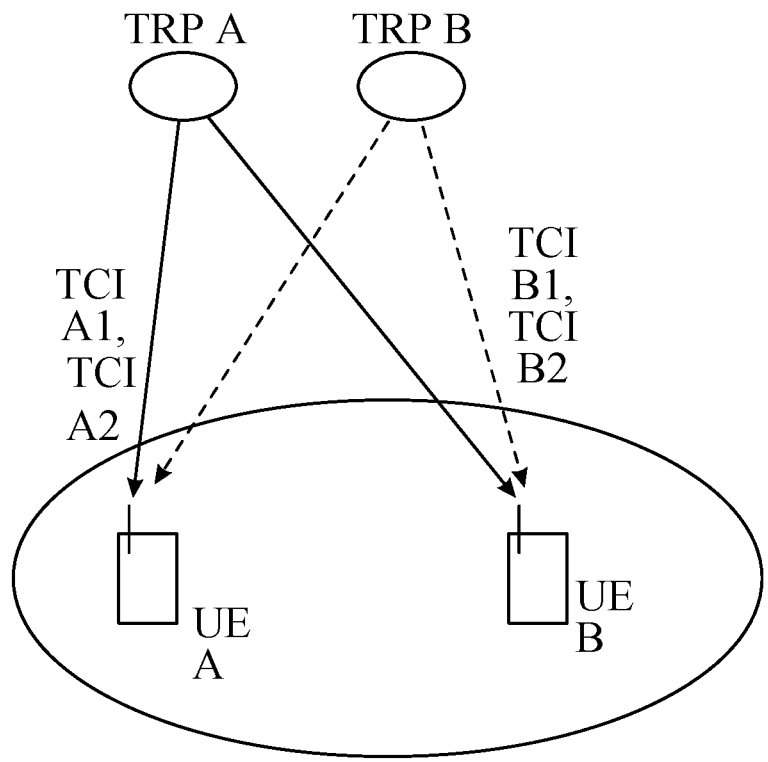

FIG. 13 illustrates examples of downlink PDCCH reception at a virtual UE formed by multiple UEs. For the same TRP transmission, the reception at different UE in the same group may need to use different reception beams.

As shown in the upper example of FIG. 13, each of the UEs in the virtual UE group (i.e., UE A, UE B, and UE C) receives a respective transmission configuration indicator (TCI) from the TRP. In this example, a downlink control information (DCI) can indicate a code point corresponding to a number of TCI states, where each TCI state correspond to a different UE in the same group. In such situations, when one of the UEs of the virtual UE group communicates with the network entity, the UE may receive DCI indicating at least one different TCI state for multiple UEs (e.g., every UE in some cases) in the virtual UE group. The UE may receive a PDSCH using at least one TCI state indicated for the UE. In some implementations, the virtual UE group may use a scheduling scheme analogous to the PDCCH multi-TRP framework of Release 16.

As shown in the lower example of FIG. 13, when multiple TRPs are transmitting TCI states to the virtual UE group, a code point may correspond to a number of TCI pairs where each TCI pair correspond to one different UE in the same virtual UE group. For example, TRP A transmits TCI A1 to UE A and TCI B1 to UE B, and TRP B transmits TCI A2 to UE A and TCI B2 to UE B. In this case, the DCI can indicate, for the multiple UEs in the virtual UE group (e.g., every UE in some cases), at least two TCI states to use for processing PDSCH transmissions from the at least two TRPs A and B.

In some examples, a UE of the virtual UE group can provide acknowledgment feedback, such as an uplink hybrid automatic repeat request (HARQ), for a PDSCH transmission to the network entity. The network entity may request a minimum scheduling delay for providing the acknowledgment feedback that takes into account delay in the communicating on the side channels.

Figure 14A:
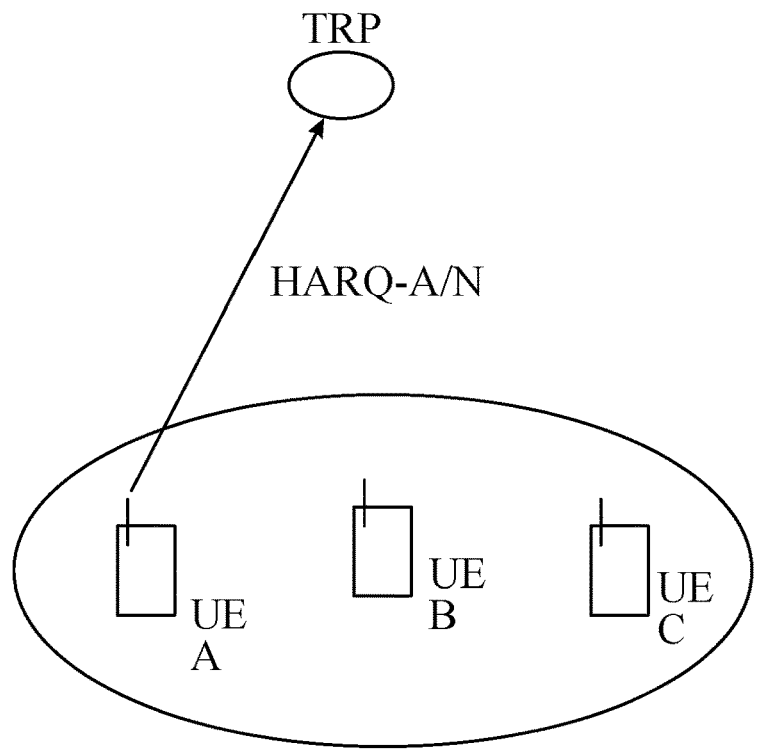
FIG. 14A illustrates an example of a single uplink HARQ feedback transmission by a virtual UE formed by one or more UEs, in accordance with certain aspects of the present disclosure.

For example, FIG. 14A illustrates an example of a single uplink HARQ feedback transmission by a virtual UE including one or more UEs. As shown in FIG. 14A, the TRP receives HARQ from UE A. Each UE of the virtual UE group may send acknowledgment feedback to the network entity directly. In case when a UE fails to decode a transmission from a TRP, the TRP may retransmit data to the virtual UE group. The UE can then request a minimum scheduling delay to account for sidelink communication delay. In some implementations, the UE may feedback a different CSI for a different minimum scheduling delay. For example, I-Q sample transfers may require a different minimum scheduling delay compared to decoding and forward.

Figure 14B:
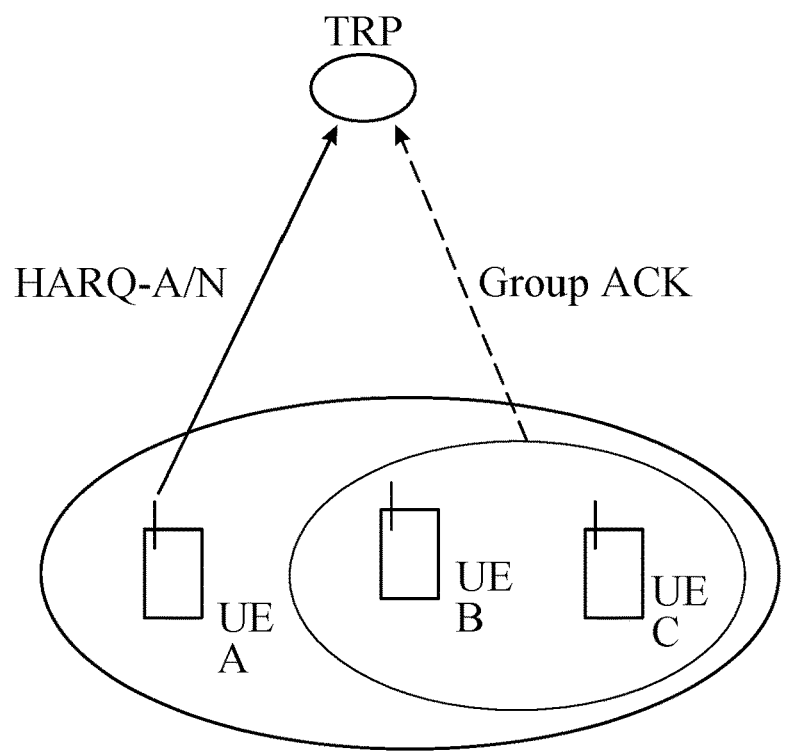
FIG. 14B illustrates an example of a multiple uplink HARQ feedback transmission by a virtual UE formed by one or more UEs, in accordance with certain aspects of the present disclosure.

FIG. 14B illustrates an example of a multiple uplink HARQ feedback transmission by a virtual UE including one or more UEs. As shown, in addition to the acknowledgment feedback sent from UE A to TRP, UE B and UE C together send a group acknowledgment to TRP, when UE B and UE C are not targets of the PDSCH transmission being acknowledged. In this example, besides a target UE sending HARQ feedback to a TRP, the virtual UE group or a subgroup of the virtual UE group (e.g., except for the target UE, the other UEs send acknowledgment feedback) may also send HARQ feedback to the TRP. In this case, the other UEs provide positive acknowledgment only on a same resource used by the UE for acknowledgment feedback upon successful decoding and refrain from sending negative acknowledgments upon decoding failure. The TRP may stop data transmission to the virtual UE group once it receives a positive feedback (e.g., either from the target UE directly or from the virtual UE group).

Figure 15:
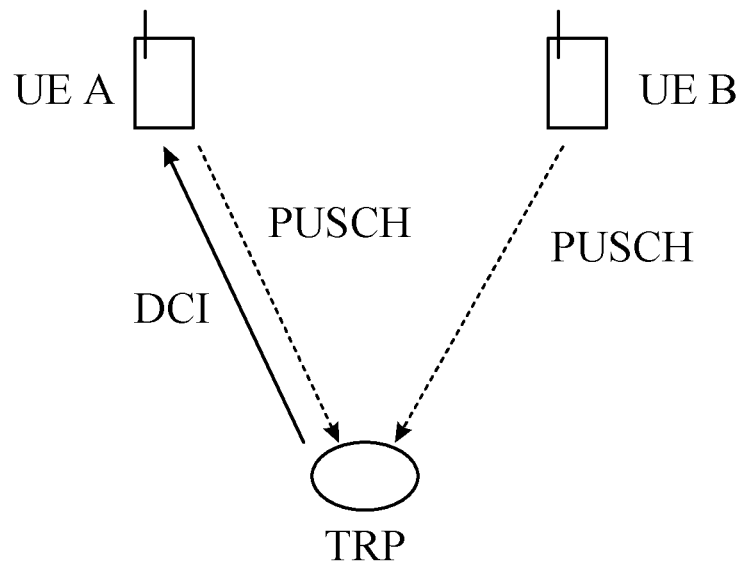
FIG. 15 illustrates examples of uplink transmission by a virtual UE formed by one or more UEs, in accordance with certain aspects of the present disclosure.
Figure 15:
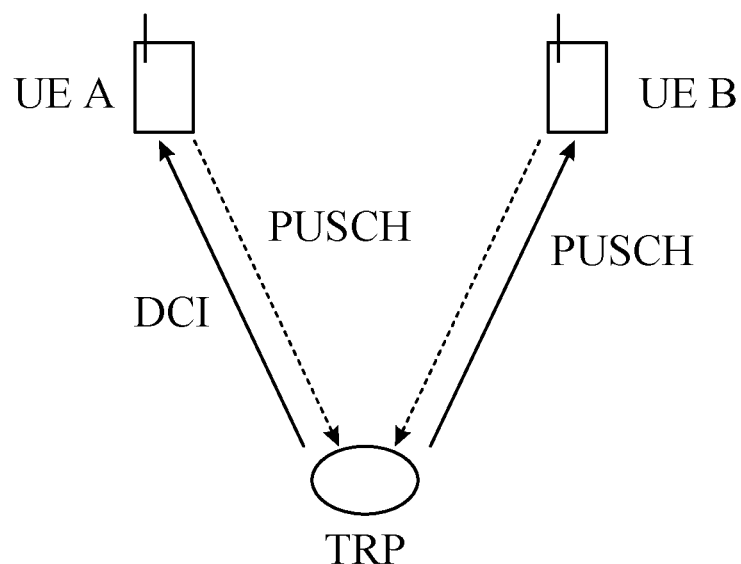

FIG. 15 illustrates examples of uplink transmission by a virtual UE formed by one or more UEs. The uplink transmission may be performed by the joint transmissions mechanism of the virtual UE. In some examples, the joint transmission mechanism of the virtual UE group may include a non-coherent joint transmission (NCJT) mechanism. For example, because different UEs may not have a tight phase synchronization, in order to reduce sidelink load, NCJT transmissions are performed across multiple UEs in the same virtual UE group. When the UE exchange information with the other UEs in the virtual UE group, the information exchanged may include payload for an uplink transmission to be sent from the multiple UEs (e.g., from each UE in some cases) in the virtual UE group.

The upper example of FIG. 15 shows a single DCI configuration, in which the TRP transmits DCI only to UE A, while both UE A and UE B sends uplink data to the TRP. In this example, the uplink transmission is scheduled via a single DCI for the virtual UE group and indicates a TCI state for the multiple UEs (i.e., UE A and UE B) in the virtual UE group.

The lower example of FIG. 15 shows a multi-DCI configuration, in which each UEs of the virtual UE group (UE A and UE B) respectively receives a DCI from the TRP. In this example, the uplink transmission is scheduled via multiple DCIs and each UE in the virtual UE group transmits according to one of the DCIs.

In some aspects, the uplink transmission of either examples of FIG. 15 may be scheduled using at least one of TDM, SDM, FDM, or SFN among UEs in the virtual UE group. In some aspects, the UE may request a minimum scheduling delay from the TRP for the uplink transmission that takes into account delay in the communicating on the sidelink channels. For example, the minimum scheduling delay may be different between single DCI and multi-DCI based transmissions, such as in the examples shown in FIG. 15. In some cases, the single DCI based transmission may require a greater minimum scheduling delay due to tighter coordination requirements.

Figure 16:
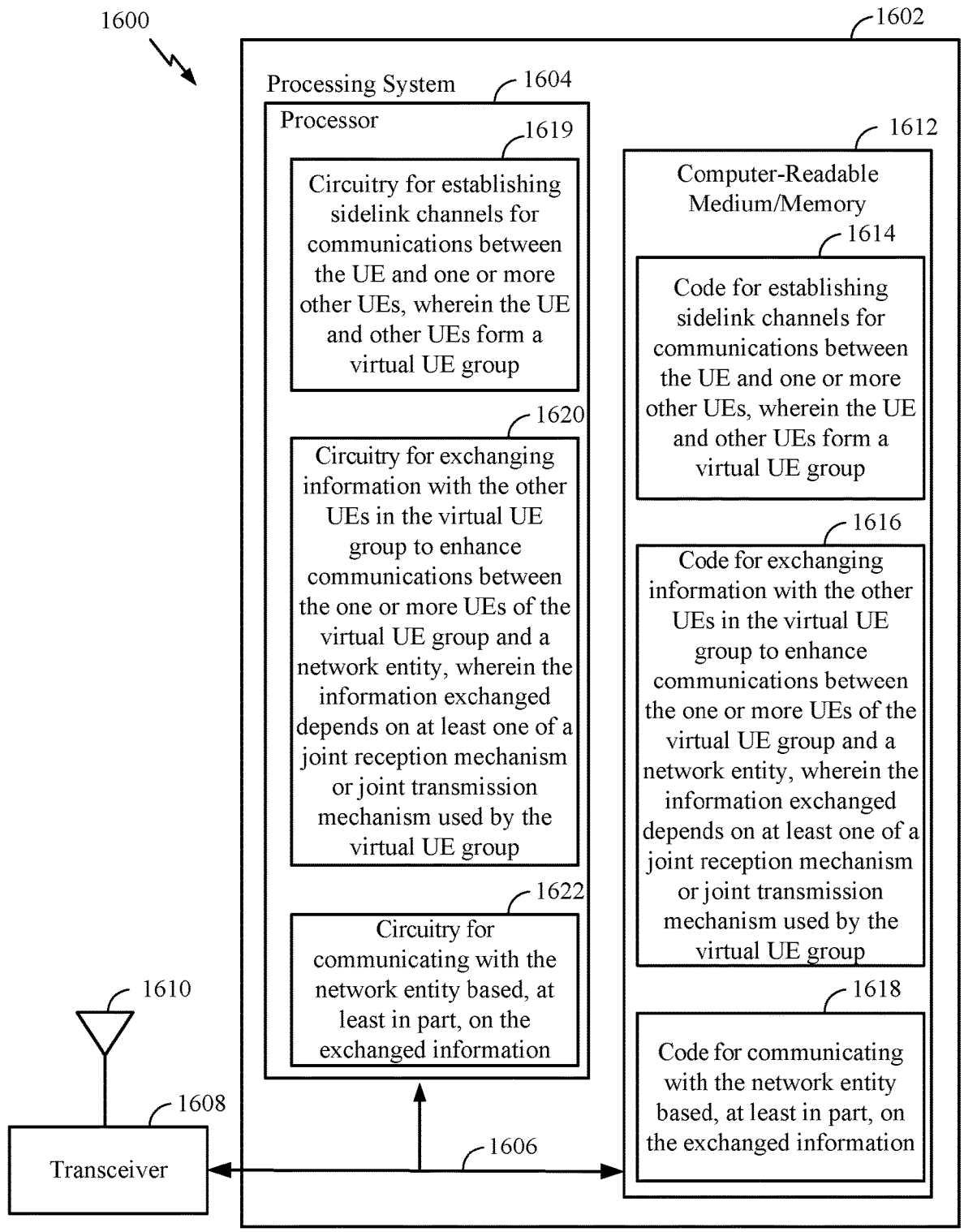
FIG. 16 illustrates a communications device that may include various components configured to perform operations for the techniques disclosed herein, in accordance with aspects of the present disclosure.

FIG. 16 illustrates a communications device 1600 (e.g., a UE) that may include various components (e.g., corresponding to means-plus-function components) configured to perform operations for the techniques disclosed herein, such as the operations 800 illustrated in FIG. 8. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations 800 illustrated in FIG. 8, or other operations for performing the various techniques discussed herein. In certain aspects, computer-readable medium/memory 1612 stores code 1614 for establishing sidelink channels for communications between the UE and one or more other UEs, wherein the UE and other UEs form a virtual UE group, code 1616 for exchanging information with the other UEs in the virtual UE group to enhance communications between the one or more UEs of the virtual UE group and a network entity, wherein the information exchanged depends on at least one of a joint reception mechanism or joint transmission mechanism used by the virtual UE group, and code 1618 for communicating with the network entity based, at least in part, on the exchanged information. In certain aspects, the processor 1604 has circuitry configured to implement the code stored in the computer-readable medium/memory 1612. The processor 1604 includes circuitry 1619 for establishing sidelink channels for communications between the UE and one or more other UEs, wherein the UE and other UEs form a virtual UE group, circuitry 1620 for exchanging information with the other UEs in the virtual UE group to enhance communications between the one or more UEs of the virtual UE group and a network entity, wherein the information exchanged depends on at least one of a joint reception mechanism or joint transmission mechanism used by the virtual UE group, and circuitry 1622 for communicating with the network entity based, at least in part, on the exchanged information.

Figure 17:
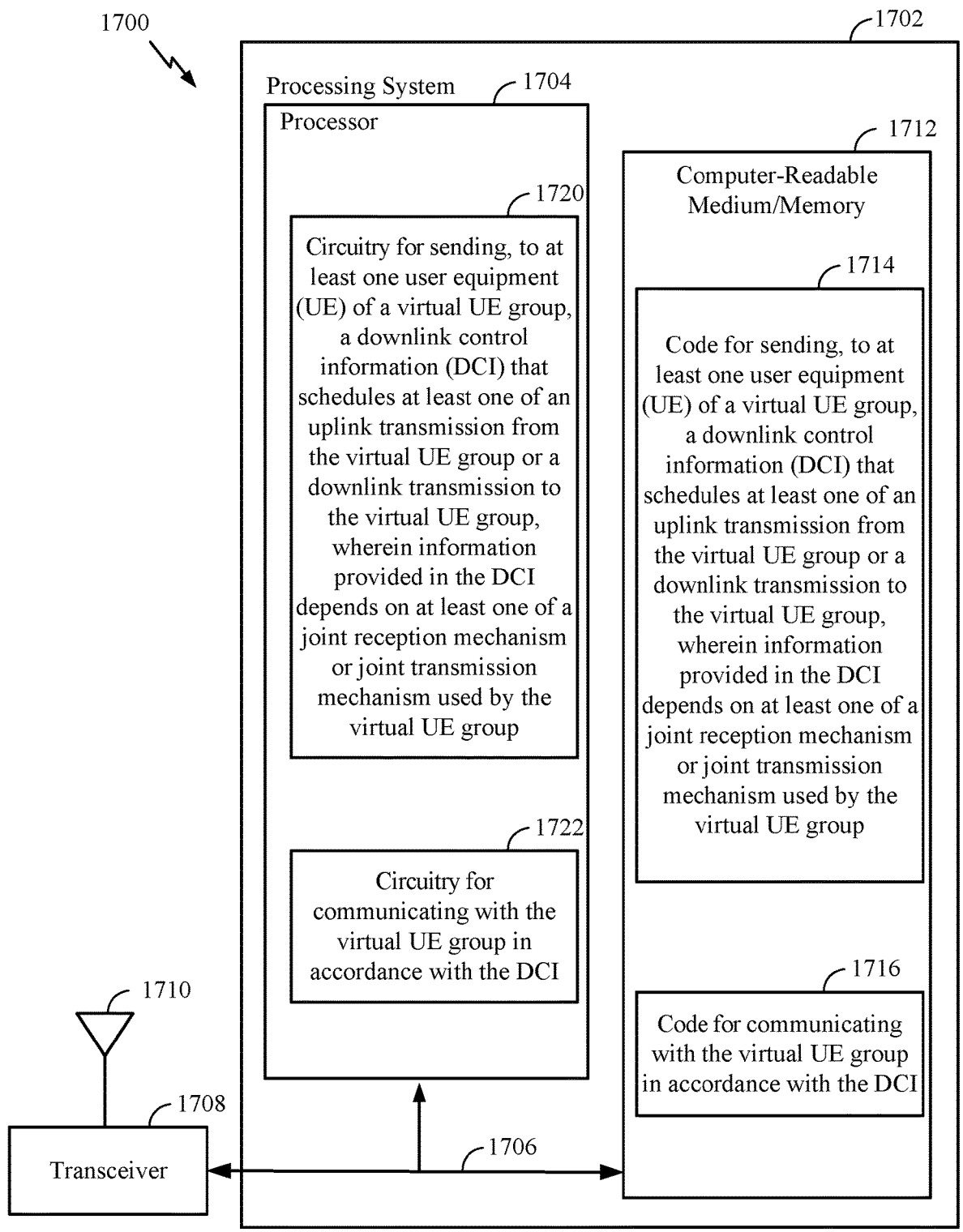
FIG. 17 illustrates a communications device that may include various components configured to perform operations for the techniques disclosed herein, in accordance with aspects of the present disclosure.

FIG. 17 illustrates a communications device 1700 (e.g., a UE) that may include various components (e.g., corresponding to means-plus-function components) configured to perform operations for the techniques disclosed herein, such as the operations 900 illustrated in FIG. 9. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations 900 illustrated in FIG. 9, or other operations for performing the various techniques discussed herein. In certain aspects, computer-readable medium/memory 1712 stores code 1714 for sending, to at least one UE of a virtual UE group, a DCI that schedules at least one of an uplink transmission from the virtual UE group or a downlink transmission to the virtual UE group, wherein information provided in the DCI depends on at least one of a joint reception mechanism or joint transmission mechanism used by the virtual UE group, and code 1716 for communicating with the virtual UE group in accordance with the DCI. In certain aspects, the processor 1704 has circuitry configured to implement the code stored in the computer-readable medium/memory 1712. The processor 1704 includes circuitry 1720 for sending, to at least one UE of a virtual UE group, a DCI that schedules at least one of an uplink transmission from the virtual UE group or a downlink transmission to the virtual UE group, wherein information provided in the DCI depends on at least one of a joint reception mechanism or joint transmission mechanism used by the virtual UE group, and circuitry 1722 for communicating with the virtual UE group in accordance with the DCI.

Example Aspects

Aspect 1: A method of wireless communication performed by a user equipment (UE), comprising: establishing sidelink channels for communications between the UE and one or more other UEs, wherein the UE and other UEs form a virtual UE group; exchanging information with the other UEs in the virtual UE group to enhance communications between the one or more UEs of the virtual UE group and a network entity, wherein the information exchanged depends on at least one of a joint reception mechanism or joint transmission mechanism used by the virtual UE group; and communicating with the network entity based, at least in part, on the exchanged information.

Aspect 2: The method of Aspect 1, wherein: the joint reception mechanism comprises a coherent joint detection mechanism; and the information exchanged comprises in-phase and quadrature (I-Q) samples taken for downlink transmissions.

Aspect 3: The method of Aspect 1, wherein: the joint reception mechanism comprises a non-coherent joint detection mechanism; and the information exchanged comprises at least one of logarithmic likelihood ratios (LLRs) or decoded bits generated for downlink transmissions.

Aspect 4: The method of Aspect 1, wherein communicating with the network entity comprises: providing channel state information (CSI) feedback to the network entity; and receiving at least one physical downlink shared channel (PDSCH) transmission from the network entity in accordance with the CSI feedback.

Aspect 5: The method of Aspect 4, wherein the at least one PDSCH transmission is scheduled using at least one of time division multiplexing (TDM) or frequency division multiplexing (FDM) among UEs in the virtual UE group.

Aspect 6: The method of Aspect 4, further comprising providing updated CSI feedback to the network entity if the virtual UE group changes.

Aspect 7: The method of Aspect 4, wherein: the CSI feedback is from the perspective of the virtual UE group; and the CSI feedback reflects the joint reception mechanism of the virtual UE group.

Aspect 8: The method of Aspect 7, wherein the PDSCH transmission conveys a medium access control (MAC) protocol data unit (PDU) with data for multiple UEs in the virtual UE group.

Aspect 9: The method of Aspect 4, wherein the UE sends its own CSI feedback.

Aspect 10: The method of Aspect 9, wherein the CSI feedback depends on at least one of: whether or not there are other UEs in the virtual UE group are simultaneously scheduled on a same set of resource elements (REs); or whether or not other UEs in the virtual UE group are receiving their own data.

Aspect 11: The method of Aspect 1, wherein communicating with the network entity comprises: receiving a downlink control information indicating at least one different transmission configuration indicator (TCI) state for each UE among multiple UEs in the virtual UE group; and receiving a physical downlink shared channel (PDSCH) using at least one TCI state indicated for the UE.

Aspect 12: The method of Aspect 1, wherein: the at least one network entity comprises at least two transmitter receiver points (TRPs); and the DCI indicates, for each UE among the multiple UEs in the virtual UE group, at least two TCI states to use for processing PDSCH transmissions from the at least two TRPs.

Aspect 13: The method of Aspect 1, wherein communicating with the network entity comprises: providing acknowledgment feedback for a scheduled physical downlink shared channel (PDSCH) transmission.

Aspect 14: The method of Aspect 13, further comprising requesting, from the network entity, a minimum scheduling delay for providing the acknowledgment feedback that takes into account delay in the communicating on the sidelink channels.

Aspect 15: The method of Aspect 13, wherein each UE of the virtual UE group sends acknowledgment feedback to the network entity.

Aspect 16: The method of Aspect 13, wherein, in addition to the acknowledgment feedback provided by the UE, a group acknowledgment feedback is provided for the virtual UE group from other UEs that are not a target of the PDSCH transmission being acknowledged.

Aspect 17: The method of Aspect 16, wherein the other UEs provide positive acknowledgment only on a same resourced used by the UE for acknowledgment feedback and refrain from sending negative acknowledgments.

Aspect 18: The method of Aspect 1, wherein: the joint transmission mechanism comprises a non-coherent joint transmission mechanism; and the information exchanged comprises payload for an uplink transmission to be sent from multiple UEs in the virtual UE group.

Aspect 19: The method of Aspect 18, wherein the uplink transmission is scheduled using at least one of time division multiplexing (TDM), spatial division multiplexing (SDM), or frequency division multiplexing (FDM), or as single frequency network (SFN) among UEs in the virtual UE group.

Aspect 20: The method of Aspect 18, wherein the uplink transmission is scheduled via a single DCI for the virtual UE group and indicates a transmission configuration indicator (TCI) state for each UE among multiple UEs in the virtual UE group.

Aspect 21: The method of Aspect 18, wherein the uplink transmission is scheduled via multiple DCIs and each UE in the virtual UE group transmit according to one of the DCIs.

Aspect 22: The method of Aspect 18, further comprising requesting, from the network entity, a minimum scheduling delay for the uplink transmission that takes into account delay in the communicating on the sidelink channels.

Aspect 23: The method of Aspect 22 further comprising requesting, from the network entity, different minimum scheduling delay for single DCI or multiple DCI based uplink transmission.

Aspect 24: A method of wireless communication performed by a network entity, comprising: sending, to at least one user equipment (UE) of a virtual UE group, a downlink control information (DCI) that schedules at least one of an uplink transmission from the virtual UE group or a downlink transmission to the virtual UE group, wherein information provided in the DCI depends on at least one of a joint reception mechanism or joint transmission mechanism used by the virtual UE group; and communicating with the virtual UE group in accordance with the DCI.

Aspect 25: The method of Aspect 24, wherein virtual UE group is formed by two or more UEs interconnected on sidelink channels and exchanging information based at least on one of the joint reception mechanism or the joint transmission mechanism.

Aspect 26: The method of Aspect 25, wherein: the joint reception mechanism comprises a coherent joint detection mechanism; and the information exchanged comprises in-phase and quadrature (I-Q) samples taken for downlink transmissions.

Aspect 27: The method of Aspect 25, wherein: the joint reception mechanism comprises a non-coherent joint detection mechanism; and the information exchanged comprises at least one of logarithmic likelihood ratios (LLRs) or decoded bits generated for downlink transmissions.

Aspect 28: The method of Aspect 25, wherein communicating with the virtual UE group in accordance with the DCI comprises: receiving channel state information (CSI) feedback from one of the two or more UEs of the virtual UE group; and providing at least one physical downlink shared channel (PDSCH) transmission in accordance with the CSI feedback.

Aspect 29: The method of Aspect 28, wherein the at least one PDSCH transmission is scheduled using at least one of time division multiplexing (TDM) or frequency division multiplexing (FDM) among UEs in the virtual UE group.

Aspect 30: The method of Aspect 28, further comprising receiving updated CSI feedback from a UE of the virtual UE group if the virtual UE group changes.

Aspect 31: The method of Aspect 28, wherein: the CSI feedback is from the perspective of the virtual UE group; and the CSI feedback reflects the joint reception mechanism of the virtual UE group.

Aspect 32: The method of Aspect 31, wherein the PDSCH transmission conveys a medium access control (MAC) protocol data unit (PDU) with data for multiple UEs in the virtual UE group.

Aspect 33: The method of Aspect 28, wherein the CSI feedback is received from a UE sending its own.

Aspect 34: The method of Aspect 33, wherein the CSI feedback depends on at least one of: whether or not there are other UEs in the virtual UE group are simultaneously scheduled on a same set of resource elements (REs); or whether or not other UEs in the virtual UE group are receiving their own data.

Aspect 35: The method of Aspect 25, wherein communicating with the virtual UE group comprises: transmitting a downlink control information (DCI) indicating at least one different transmission configuration indicator (TCI) state for each UE among multiple UEs in the virtual UE group; and transmitting a physical downlink shared channel (PDSCH) based on at least one TCI state indicated for a UE in the virtual UE group.

Aspect 36: The method of Aspect 25, wherein: the at least one network entity comprises at least two transmitter receiver points (TRPs); and the DCI indicates, for each UE among multiple UEs in the virtual UE group, at least two TCI states to use for processing PDSCH transmissions from the at least two TRPs.

Aspect 37: The method of Aspect 25, wherein communicating with the virtual UE group comprises: receiving acknowledgment feedback for a scheduled physical downlink shared channel (PDSCH) transmission.

Aspect 38: The method of Aspect 37, further comprising providing, to the virtual UE group, a minimum scheduling delay for the acknowledgment feedback that takes into account delay in the communicating on the sidelink channels.

Aspect 39: The method of Aspect 37, wherein each UE of the virtual UE group sends acknowledgment feedback to the network entity.

Aspect 40: The method of Aspect 37, wherein, in addition to the acknowledgment feedback provided by the UE, a group acknowledgment feedback is provided for the virtual UE group from other UEs that are not a target of the PDSCH transmission being acknowledged.

Aspect 41: The method of Aspect 40, wherein the other UEs provide positive acknowledgment only on a same resourced used by the UE for acknowledgment feedback and refrain from sending negative acknowledgments.

Aspect 42: The method of Aspect 25, wherein: the joint transmission mechanism comprises a non-coherent joint transmission mechanism; and the information exchanged comprises payload for an uplink transmission to be sent from multiple UEs in the virtual UE group.

Aspect 43: The method of Aspect 42, wherein the uplink transmission from multiple UEs in the virtual UE group is scheduled using at least one of time division multiplexing (TDM), spatial division multiplexing (SDM), or frequency division multiplexing (FDM), or as single frequency network (SFN) among UEs in the virtual UE group.

Aspect 44: The method of Aspect 42, wherein the uplink transmission is scheduled via a single DCI for the virtual UE group and indicates a transmission configuration indicator (TCI) state for each UE among multiple UEs in the virtual UE group.

Aspect 45: The method of Aspect 42, wherein the uplink transmission is scheduled via multiple DCIs and each UE in the virtual UE group transmit according to one of the DCIs.

Aspect 46: The method of Aspect 42, further comprising providing, to the virtual UE group, a minimum scheduling delay for the uplink transmission that takes into account delay in the communicating on the sidelink channels.

Aspect 47: The method of Aspect 46, further comprising providing, to the virtual UE group, a different minimum scheduling delay for either one of a single-DCI based uplink transmission or a multiple-DCI based uplink transmission.

Aspect 48: An apparatus for wireless communication performed by a user equipment (UE), comprising: means for establishing sidelink channels for communications between the UE and one or more other UEs, wherein the UE and other UEs form a virtual UE group; means for exchanging information with the other UEs in the virtual UE group to enhance communications between the one or more UEs of the virtual UE group and a network entity, wherein the information exchanged depends on at least one of a joint reception mechanism or joint transmission mechanism used by the virtual UE group; and means for communicating with the network entity based, at least in part, on the exchanged information.

Aspect 49: An apparatus for wireless communication performed by a network entity, comprising: means for sending, to at least one user equipment (UE) of a virtual UE group, a downlink control information (DCI) that schedules at least one of an uplink transmission from the virtual UE group or a downlink transmission to the virtual UE group, wherein information provided in the DCI depends on at least one of a joint reception mechanism or joint transmission mechanism used by the virtual UE group; and means for communicating with the virtual UE group in accordance with the DCI.

Aspect 50: An apparatus for wireless communication performed by a user equipment (UE), comprising: at least one processor and a memory configured to establish sidelink channels for communications between the UE and one or more other UEs, wherein the UE and other UEs form a virtual UE group; exchange information with the other UEs in the virtual UE group to enhance communications between the one or more UEs of the virtual UE group and a network entity, wherein the information exchanged depends on at least one of a joint reception mechanism or joint transmission mechanism used by the virtual UE group; and communicate with the network entity based, at least in part, on the exchanged information.

Aspect 51: An apparatus for wireless communication performed by a network entity, comprising: at least one processor and a memory configured to send, to at least one user equipment (UE) of a virtual UE group, a downlink control information (DCI) that schedules at least one of an uplink transmission from the virtual UE group or a downlink transmission to the virtual UE group, wherein information provided in the DCI depends on at least one of a joint reception mechanism or joint transmission mechanism used by the virtual UE group; and communicate with the virtual UE group in accordance with the DCI.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 8, and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication performed by a user equipment (UE), comprising:
   establishing sidelink channels for communications between the UE and one or more other UEs, wherein the UE and the one or more other UEs form a virtual UE group;
   exchanging information with the one or more other UEs in the virtual UE group to enhance communications between at least one of the UE or the one or more other UEs of the virtual UE group and a network entity, wherein the information exchanged depends on at least one of a joint reception mechanism or joint transmission mechanism used by the virtual UE group, wherein the information exchanged comprises at least one of in-phase and quadrature (I-Q) samples taken for downlink transmissions, logarithmic likelihood ratios (LLRs) for the downlink transmissions, or decoded bits generated for downlink transmissions; and
   communicating with the network entity based, at least in part, on the exchanged information.

2. The method of claim 1, wherein:
   the joint reception mechanism comprises a coherent joint detection mechanism; and
   the information exchanged comprises the I-Q samples taken for the downlink transmissions.

3. The method of claim 1, wherein:
   the joint reception mechanism comprises a non-coherent joint detection mechanism; and
   the information exchanged comprises at least one of the LLRs or the decoded bits generated for the downlink transmissions.

4. The method of claim 1, wherein communicating with the network entity comprises:
   providing channel state information (CSI) feedback to the network entity; and
   receiving at least one physical downlink shared channel (PDSCH) transmission from the network entity in accordance with the CSI feedback.

5. The method of claim 4, wherein the at least one PDSCH transmission is scheduled using at least one of time division multiplexing (TDM) or frequency division multiplexing (FDM) among UEs in the virtual UE group.

6. The method of claim 4, further comprising providing updated CSI feedback to the network entity if the virtual UE group changes.

7. The method of claim 4, wherein:
   the CSI feedback is from a perspective of the virtual UE group; and
   the CSI feedback reflects the joint reception mechanism of the virtual UE group.

8. The method of claim 7, wherein the PDSCH transmission conveys a medium access control (MAC) protocol data unit (PDU) with data for multiple UEs in the virtual UE group.

9. The method of claim 4, wherein the UE sends its own CSI feedback, and wherein the CSI feedback depends on at least one of:
whether or not the other UEs in the virtual UE group are simultaneously scheduled on a same set of resource elements (REs); or
whether or not the one or more other UEs in the virtual UE group are receiving their own data.

10. The method of claim 1, wherein communicating with the network entity comprises:
receiving a downlink control information indicating at least one different transmission configuration indicator (TCI) state for each UE among multiple UEs in the virtual UE group; and
receiving a physical downlink shared channel (PDSCH) using at least one TCI state indicated for the UE.

11. The method of claim 1, further comprising:
receiving downlink control information indicating, for each UE in the virtual UE group, at least two TCI states to use for processing PDSCH transmissions from at least two transmitter receiver points (TRPs).

12. The method of claim 1, wherein communicating with the network entity comprises:
providing acknowledgment feedback for a scheduled physical downlink shared channel (PDSCH) transmission.

13. The method of claim 12, further comprising requesting, from the network entity, a minimum scheduling delay for providing the acknowledgment feedback that takes into account delay in the communicating on the sidelink channels.

14. The method of claim 12, wherein each UE of the virtual UE group sends acknowledgment feedback to the network entity.

15. The method of claim 12, wherein, in addition to the acknowledgment feedback provided by the UE, a group acknowledgment feedback is provided for the virtual UE group from the one or more other UEs that are not a target of the PDSCH transmission being acknowledged.

16. The method of claim 15, wherein the one or more other UEs provide positive acknowledgment only on a same resource used by the UE for acknowledgment feedback and refrain from sending negative acknowledgments.

17. The method of claim 1, wherein:
the joint transmission mechanism comprises a non-coherent joint transmission mechanism; and
the information exchanged comprises payload for an uplink transmission to be sent from multiple UEs in the virtual UE group.

18. The method of claim 17, wherein the uplink transmission is scheduled using at least one of time division multiplexing (TDM), spatial division multiplexing (SDM), or frequency division multiplexing (FDM), or as single frequency network (SFN) among UEs in the virtual UE group.

19. The method of claim 17, wherein the uplink transmission is scheduled via a single DCI for the virtual UE group and indicates a transmission configuration indicator (TCI) state for each UE among multiple UEs in the virtual UE group.

20. The method of claim 17, wherein the uplink transmission is scheduled via multiple DCIs and each UE in the virtual UE group transmit according to one of the DCIs.

21. The method of claim 17, further comprising requesting, from the network entity, a minimum scheduling delay for the uplink transmission that takes into account delay in the communicating on the sidelink channels.

22. The method of claim 21 further comprising requesting, from the network entity, different minimum scheduling delay for single DCI or multiple DCI based uplink transmission.

23. An apparatus for wireless communication performed by a user equipment (UE), comprising:
at least one processor and a memory configured to
establish sidelink channels for communications between the UE and one or more other UEs, wherein the UE and the one or more other UEs form a virtual UE group;
exchange information with the one or more other UEs in the virtual UE group to enhance communications between at least one of the UE or the one or more other UEs of the virtual UE group and a network entity, wherein the information exchanged depends on at least one of a joint reception mechanism or joint transmission mechanism used by the virtual UE group, wherein the information exchanged comprises at least one of in-phase and quadrature (I-Q) samples taken for downlink transmissions, logarithmic likelihood ratios (LLRs) for the downlink transmissions, or decoded bits generated for downlink transmissions; and
communicate with the network entity based, at least in part, on the exchanged information.

24. An apparatus for wireless communication, comprising:
means for establishing sidelink channels for communications between a user equipment (UE) and one or more other UEs, wherein the UE and the one or more other UEs form a virtual UE group;
means for exchanging information with the one or more other UEs in the virtual UE group to enhance communications between at least one of the UE or the one or more other UEs of the virtual UE group and a network entity, wherein the information exchanged depends on at least one of a joint reception mechanism or joint transmission mechanism used by the virtual UE group, wherein the information exchanged comprises at least one of in-phase and quadrature (I-Q) samples taken for downlink transmissions, logarithmic likelihood ratios (LLRs) for the downlink transmissions, or decoded bits generated for downlink transmissions; and
means for communicating with the network entity based, at least in part, on the exchanged information.

25. A non-transitory computer-readable medium having instructions stored thereon, that when executed by one or more processors, cause the one or more processors to:
establish sidelink channels for communications between a user equipment (UE) and one or more other UEs, wherein the UE and the one or more other UEs form a virtual UE group;
exchange information with the one or more other UEs in the virtual UE group to enhance communications between at least one of the UE or the one or more other UEs of the virtual UE group and a network entity, wherein the information exchanged depends on at least one of a joint reception mechanism or joint transmission mechanism used by the virtual UE group, wherein the information exchanged comprises at least one of in-phase and quadrature (I-Q) samples taken for downlink transmissions, logarithmic likelihood ratios (LLRs) for the downlink transmissions, or decoded bits generated for downlink transmissions; and communicate with the network entity based, at least in part, on the exchanged information.

* * * * *